(12) United States Patent
Suzuki

(10) Patent No.: US 11,132,150 B2
(45) Date of Patent: Sep. 28, 2021

(54) STORAGE MEDIUM STORING COMPUTER-READABLE INSTRUCTIONS FOR CAUSING INFORMATION PROCESSING APPARATUS TO DISPLAY INFORMATION OF PRINTER

(71) Applicant: BROTHER KOGYO KABUSHIKI KAISHA, Nagoya (JP)

(72) Inventor: Hiroaki Suzuki, Nagoya (JP)

(73) Assignee: BROTHER KOGYO KABUSHIKI KAISHA, Aichi (JP)

( * ) Notice: Subject to any disclaimer, the term of this patent is extended or adjusted under 35 U.S.C. 154(b) by 0 days.

(21) Appl. No.: 17/066,951

(22) Filed: Oct. 9, 2020

(65) Prior Publication Data

US 2021/0042063 A1 Feb. 11, 2021

Related U.S. Application Data

(63) Continuation of application No. 16/203,759, filed on Nov. 29, 2018, now Pat. No. 10,802,772.

(30) Foreign Application Priority Data

Nov. 30, 2017 (JP) .............................. JP2017-231104

(51) Int. Cl.
*G06F 15/00* (2006.01)
*G06F 3/12* (2006.01)
*H04N 1/00* (2006.01)

(52) U.S. Cl.
CPC ............ *G06F 3/121* (2013.01); *G06F 3/1219* (2013.01); *G06F 3/1229* (2013.01);
(Continued)

(58) Field of Classification Search
CPC ...... G06F 3/121; G06F 3/1219; G06F 3/1229; G06F 3/1259; G06F 3/1285; H04N 1/00477
(Continued)

(56) References Cited

U.S. PATENT DOCUMENTS

2011/0164886 A1 7/2011 Sawada
2013/0027737 A1 1/2013 Suzuki
(Continued)

FOREIGN PATENT DOCUMENTS

JP 2016-053949 A 4/2016

OTHER PUBLICATIONS

Notice of Allowance dated Jun. 8, 2020 received in related U.S. Appl. No. 16/203,759.
(Continued)

*Primary Examiner* — Mark R Milia
(74) *Attorney, Agent, or Firm* — Scully Scott Murphy & Presser

(57) ABSTRACT

A non-transitory computer-readable storage medium stores computer-readable instructions for an information processing apparatus including: a processor; a display; and a memory storing at least one set of printer information. First and second type printers transmit status information to the information processing apparatus. The status information from the first type printer includes first information. The status information from the second type printer includes second information. The computer-readable instructions, when executed by the processor, cause the information processing apparatus to perform: setting target printer information to one of the at least one set of printer information; receiving the status information from a printer specified by the target printer information; and displaying, when the received status information includes the first information, a
(Continued)

first screen on the display; and displaying, when the received status information includes the second information and does not include the first information, a second screen on the display.

13 Claims, 12 Drawing Sheets

(52) U.S. Cl.
CPC .......... *G06F 3/1259* (2013.01); *G06F 3/1285* (2013.01); *H04N 1/00477* (2013.01)

(58) Field of Classification Search
USPC ........................................................ 358/1.14
See application file for complete search history.

(56) References Cited

U.S. PATENT DOCUMENTS

2015/0339081 A1  11/2015  Honda et al.
2016/0059577 A1   3/2016  Horikoshi
2016/0378020 A1  12/2016  Asaka

OTHER PUBLICATIONS

Office Action dated Dec. 27, 2019 received in related U.S. Appl. No. 16/203,759.

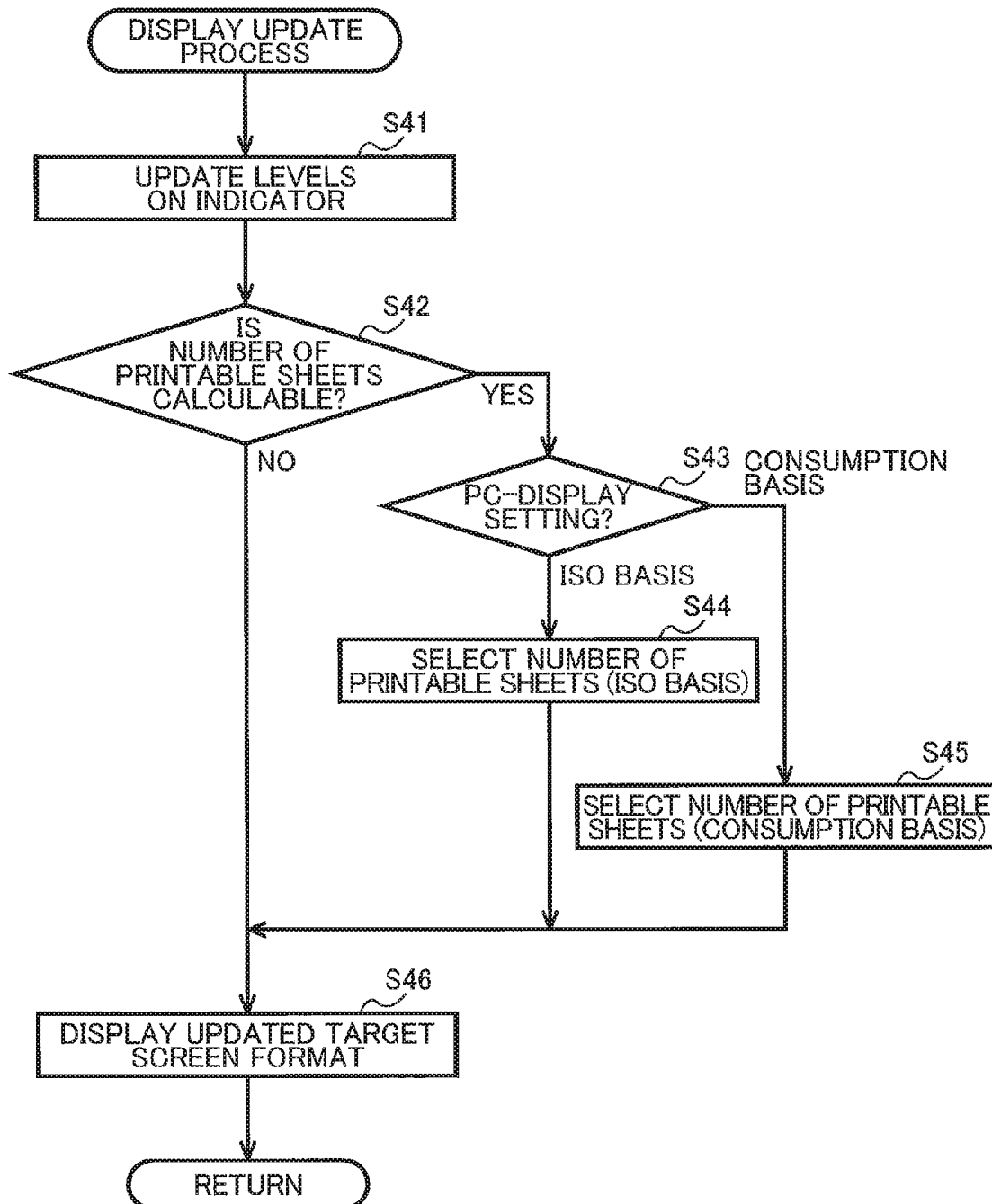

STORAGE MEDIUM STORING COMPUTER-READABLE INSTRUCTIONS FOR CAUSING INFORMATION PROCESSING APPARATUS TO DISPLAY INFORMATION OF PRINTER

CROSS REFERENCE TO RELATED APPLICATION

This application is a continuation application of U.S. patent application Ser. No. 16/203,759 filed on Nov. 29, 2018 and claims priority under 35 U.S.C. § 119 from Japanese Patent Application No. 2017-231104 filed Nov. 30, 2017. The entire content of the priority application is incorporated herein by reference.

TECHNICAL FIELD

The present invention relates to a storage medium storing computer-readable instructions for causing an information processing apparatus to display information of a printer on a display of the information processing apparatus.

BACKGROUND

Japanese Patent Application Publication No. 2016-53949 discloses an information processing apparatus including a status monitor. The status monitor displays the status of a printer on a display. Specifically, the status monitor receives status information transmitted from the printer, and displays the information based to the received status information on the display.

SUMMARY

Different types of printers with different specifications are predicted to be connected to a communication network. In such a case, the status monitor disclosed in the publication '949 may not satisfactorily be able to deal with information transmitted from the different types of printers connected to the communication network.

In view of the foregoing, it is an object of the present disclosure to provide a storage medium storing computer-readable instructions for enabling an information processing apparatus to properly deal with information transmitted from the different types of printers.

In order to attain the above and other objects, according to one aspect, the disclosure provides a non-transitory computer-readable storage medium storing computer-readable instructions for an information processing apparatus. The information processing apparatus includes: a processor; a network interface; a display; and a memory. The memory stores at least one set of printer information corresponding to at least one printer in one-to-one basis. Each of the at least one set of printer information specifies one of a plurality of types to which the corresponding printer belongs. The plurality of types include a first type printer and a second type printer. The first type printer and the second type printer each are configured to: print using consumable material; and transmit status information to the information processing apparatus. The status information transmitted from the first type printer includes first information about the consumable material. The status information transmitted from the second type printer includes second information about the consumable material and does not include the first information. The computer-readable instructions, when executed by the processor, cause the information processing apparatus to perform: (a) setting target printer information to one from among the at least one set of printer information; (b) receiving the status information from a target printer via the network interface, the target printer being one specified by the set target printer information from among the at least one printer; and (c) displaying, when the received status information includes the first information, a first screen on the display; and (d) displaying, when the received status information includes the second information and does not include the first information, a second screen on the display.

According to another aspect, the disclosure provides a non-transitory computer-readable storage medium storing computer-readable instructions for an information processing apparatus. The information processing apparatus includes: a processor; a user interface; a network interface; a first display; and a memory. The memory stores at least one set of printer information corresponding to at least one printer in one-to-one basis. Each of the at least one set of printer information specifies one of a plurality of types to which the corresponding printer belongs. The plurality of types include a specific type printer including a second display. The specific type printer is configured to: transmit, to the information processing apparatus, status information including first information and second information; select one of the first information and the second information; and display, on the second display, the selected one of the first information and the second information. The computer-readable instructions, when executed by the processor, cause the information processing apparatus to perform: (a) setting target printer information to one from among from among the at least one set of printer information; (b) receiving the status information from a target printer via the network interface, the target printer being one specified by the set target printer information from among the at least one printer; and (c) receiving, when the set printer information indicates that the target printer is the specific type printer, a selection of one of the first information and the second information via the user interface; (d) displaying, when the (c) receiving receives a selection of the first information, a first screen including the first information included in the received status information on the display, and (e) displaying, when the (c) receiving receives a selection of the second information, a second screen including the second information included in the received status information on the display.

According to still another aspect, the disclosure provides a non-transitory computer-readable storage medium storing computer-readable instructions for an information processing apparatus. The information processing apparatus includes: a processor; a user interface; a network interface; a first display; and a memory. The memory stores at least one set of printer information corresponding to at least one printer in one-to-one basis. Each of the at least one set of printer information specifies one of a plurality of types to which the corresponding printer belongs. The plurality of types include a specific type printer including a second display. The specific type printer is configured to: set a display setting to one of: a first setting in which the specific type printer displays first information on the second display; a second setting in which the specific type printer displays second information on the second display; and a third setting in which the specific type printer displays neither the first information nor the second information on the second display; and transmit, to the information processing apparatus, status information including the first information, the second information, and third information, the third information indicating which one of the first setting, the second setting, and the third setting has been set as the display setting. The computer-readable instructions, when executed by the processor, cause the information processing apparatus to perform: (a) setting target printer information to one from among the at least one set of printer information; (b) receiving the status information from a target printer via the network interface, the target printer being one specified by the set target printer information from among the at least one printer; (c) determining, when the set printer information indicates that the target printer is the specific type printer, whether a selection of the first information has been received via the user interface; (d) displaying, in response to determining that the selection of the first information has been received, a first screen including the first information included in the received status information on the first display; (e) determining, in response to determining that the selection of the first information has not received, whether a selection of the second information has been received via the user interface; (f) displaying, in response to determining that the selection of the second information has been received, a second screen including the second information included in the received status information on the first display; (g) determining, when determining that the selection of the second information has not been received, which one of the first setting, the second setting, and the third setting has been set as the display setting on the basis of the third information included in the received status information; (h) displaying, in response to determining that the first setting has been set as the display setting, the first screen including the first information included in the received status information on the first display; (i) displaying, in response to determining that the second setting has been set as the display setting, the second screen including the second information included in the received status information on the first display; and (j) displaying, in response to determining that the third setting has been set as the display setting, a third screen on the first display, the third screen including neither the first information included in the received status information nor the second information included in the received status information.

According to still another aspect, the disclosure provides a non-transitory computer-readable storage medium storing computer-readable instructions for an information processing apparatus. The information processing apparatus includes: a processor; a user interface; a network interface; a first display; and a memory. The memory stores at least one set of printer information corresponding to at least one printer in one-to-one basis. Each of the at least one set of printer information specifies one of a plurality of types to which the corresponding printer belongs. The plurality of types include a specific type printer includes a second display. The specific type printer is configured to: select one of the first information and the second information; display, on the second display, the selected one of the first information and the second information; and transmit, to the information processing apparatus, status information including the first information, the second information, and selection information, the selection information indicating which one of the first information and the second information is being displayed on the second display. The computer-readable instructions, when executed by the processor, cause the information processing apparatus to perform: (a) setting target printer information to one from among the at least one set of printer information; (b) receiving the status information from a target printer via the network interface, the target printer being one specified by the set target printer information from among the at least one printer; and (c) determining, when the set printer information indicates that the target printer is the specific type printer, which one of the first information and the second information is being displayed on the second display on the basis of the selection information included in the received status information, (d) displaying, in response to determining that the first information is being displayed on the second display, the first information included in the status information on the first display; and (e) displaying, in response to determining that the second information is being displayed on the second display, the second information included in the status information on the first display.

According to still another aspect, the disclosure provides a non-transitory computer-readable storage medium storing computer-readable instructions for an information processing apparatus. The information processing apparatus includes: a processor; a user interface; a network interface; a first display; and a memory. The memory stores at least one set of printer information corresponding to at least one printer in one-to-one basis. Each of the at least one set of printer information specifies one of a plurality of types to which the corresponding printer belongs. The plurality of types include a specific type printer including a second display. The specific type printer is configured to: select one of the first information and the second information; display, on the second display, the selected one of the first information and the second information; and transmit, to the information processing apparatus, status information including one of the first information and the second information which is being displayed on the second display. The computer-readable instructions, when executed by the processor, cause the information processing apparatus to perform: (a) setting target printer information to one from among the at least one set of printer information; (b) receiving the status information from a target printer via the network interface, the target printer being one specified by the set target printer information from among the at least one printer; and (c) determining, when the set printer information indicates that the target printer is the specific type printer, whether the received status information includes the first information or the second information; (d) displaying, in response to determining that the received status information includes the first information, the first information included in the status information and third information on the first display, the third information indicating that the first information is being displayed on the first display; and (e) displaying, in response to determining that the received status information includes the second information, the second information included in the status information and fourth information on the first display, the fourth information indicating that the second information is being displayed on the first display.

BRIEF DESCRIPTION OF THE DRAWINGS

The particular features and advantages of the embodiment(s) as well as other objects will become apparent from the following description taken in connection with the accompanying drawings, in which:

FIG. 6A is a flowchart illustrating steps in a display update process executed by the controller of the PC in the system according to the first embodiment;

DETAILED DESCRIPTION

Next, embodiments of the present disclosure will be described while referring to the accompanying drawings. Note that it would be apparent to those skilled in the art that the embodiments described below are merely examples of the present disclosure and modifications and variations may be made to the embodiments. For example, the order for executing the processes described below may be appropriately modified.

First Embodiment

Figure 1:
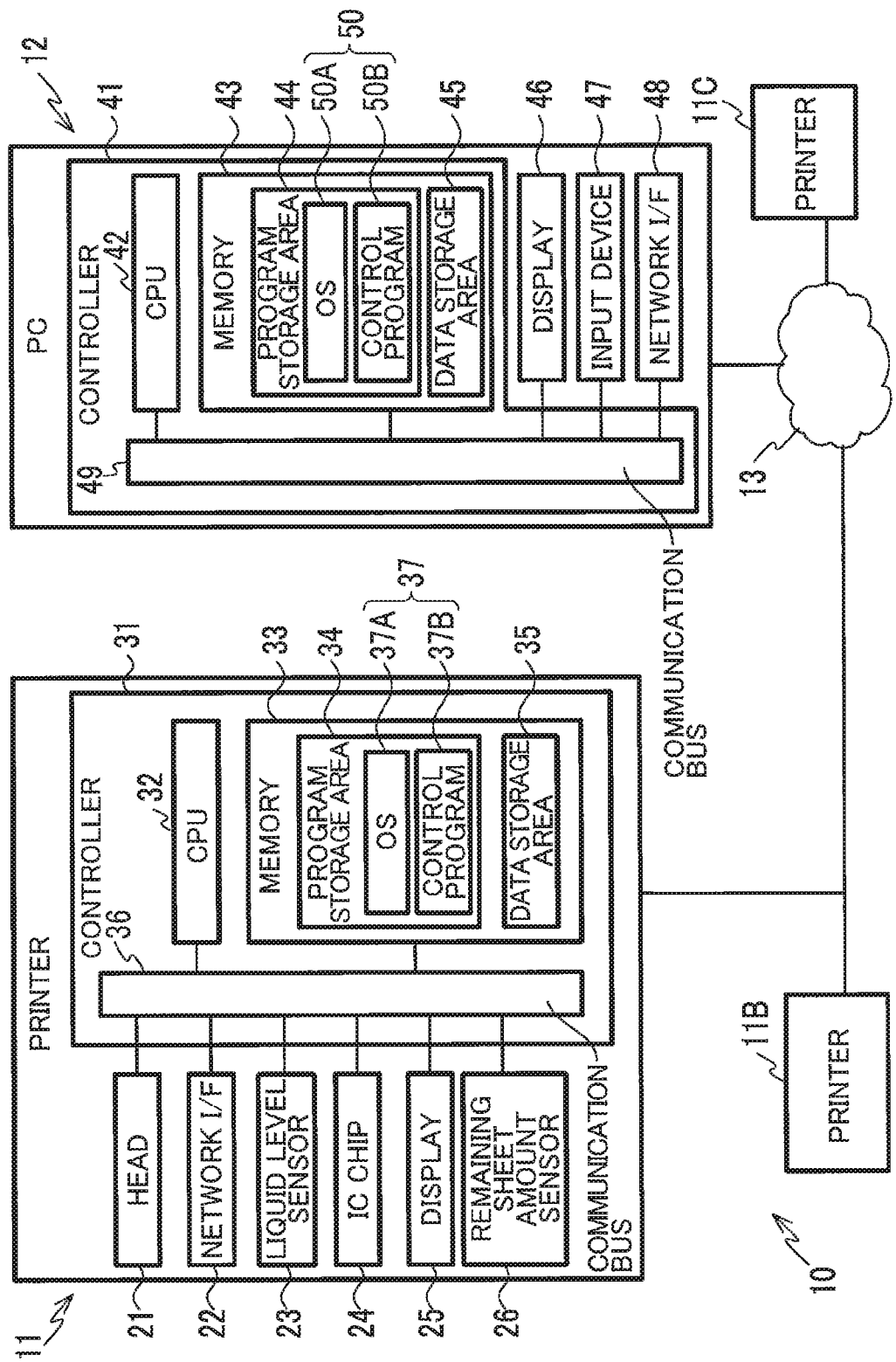
FIG. 1 is a view illustrating an overview of a system according to a first embodiment of the present disclosure.

FIG. 1 illustrates an overview of a system 10 according to a first embodiment of the present disclosure. The system 10 includes a plurality of printers 11 and a personal computer 12 (hereinafter, simply referred to as "PC 12"). In FIG. 1, three printers 11A, 11B, and 11C are illustrated as the printers 11. The number of printers 11, however, is not limited to three.

The printers 11 and the PC 12 are connected to a communication network 13 and can communicate with each other through the communication network 13. The communication network 13 is a local area network (LAN), for example. The LAN may be a wired LAN or a wireless LAN.

The printer 11A, the printer 11B, and the printer 11C have different types from each other. Specifically, the models of these three printers 11A, 11B, and 11C differ from each other. In other words, the three printers 11A, 11B, and 11C are different in their function from each other. For example, the printer 11A and the printer 11B are so-called color inkjet printers, while the printer 11C is a so-called monochrome inkjet printer. The printer 11A includes two types of containers for storing ink. Specifically, the printer 11A includes: tanks 62; and cartridges 60 detachable from an attachment case 61 of the printer 11A. The printer 11B includes only one type of containers for storing ink. Specifically, the printer 11B includes the cartridges 60 but does not include the tanks 62. The types of the printers 11, however, are not limited to the types described above. The printer 11A is an example of the claimed "first type printer". The printer 11B is an example of the claimed "second type printer". The printer 11C is an example of the claimed "second type printer".

The PC 12 transmits print data to one of the printers 11 to instruct the printer 11 to print. Subsequently, the PC 12 receives status information from the printer 11 and displays the status information on a display 46. Details will be described below.

Figure 2:
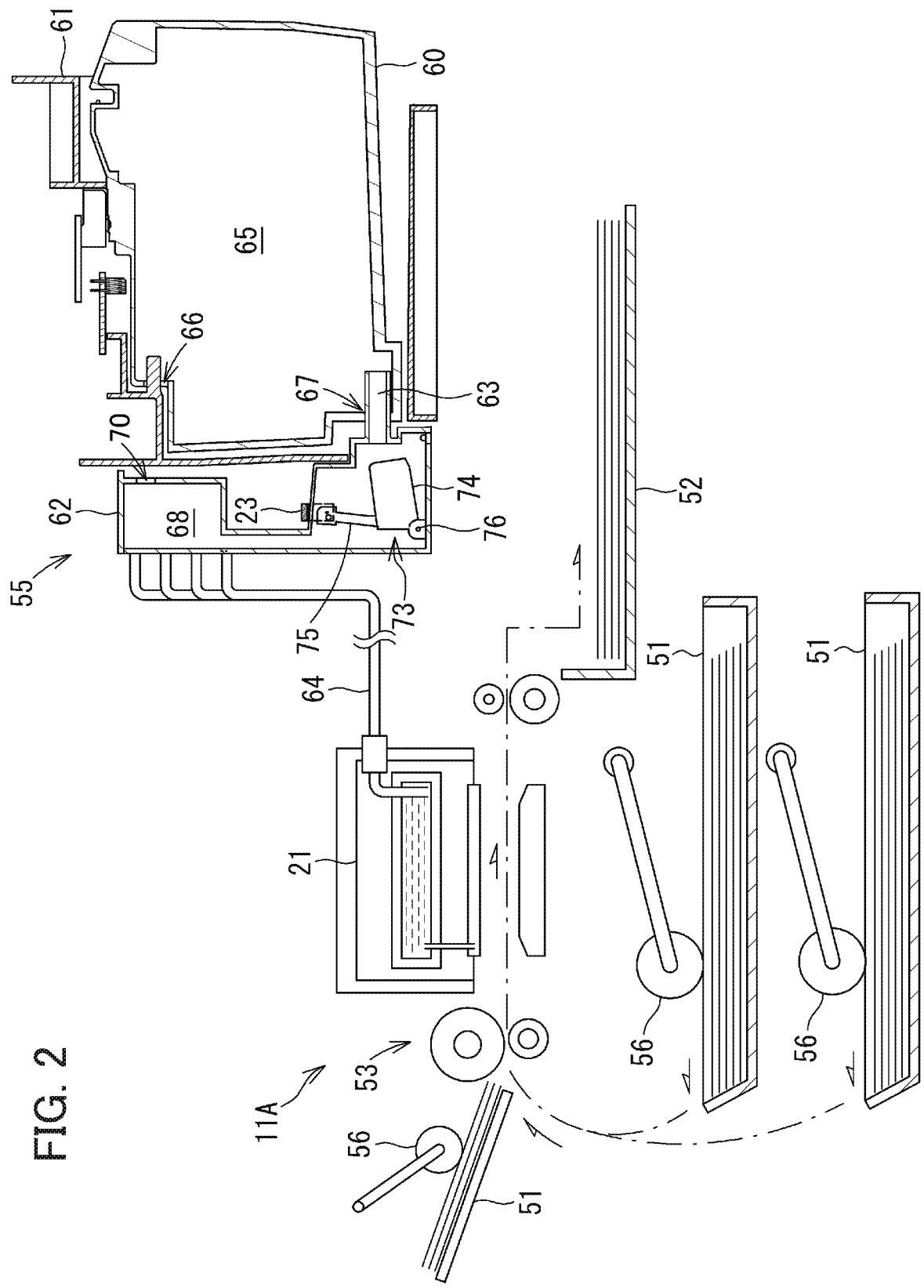
FIG. 2 is a schematic diagram illustrating a configuration of a printer in the system according to the first embodiment.

As illustrated in FIG. 2, the printer 11A includes a plurality of feeding trays 51, a discharge tray 52, a conveying mechanism 53, a head 21, and an ink supply unit 55. Sheets can be placed on the feeding trays 51 and the discharge tray 52. The conveying mechanism 53 is configured to convey sheets from individual feeding trays 51 to the discharge tray 52. The head 21 is configured to perform a printing process by discharging ink onto a sheet being conveyed. The ink supply unit 55 is configured to supply ink to the head 21. Ink is an example of the claimed "consumable material". The sheets are an example of the claimed "consumable supplies".

In FIG. 2, the three feeding trays 51 are illustrated. The number of feeding trays 51, however, is not limited to three.

The ink supply unit 55 is configured to supply ink from the individual cartridges 60 to the head 21. Each cartridge 60 stores ink. The ink supply unit 55 includes the attachment case 61, the tanks 62, channels 63, and tubes 64. Each cartridge 60 is attachable to the attachment case 61. Each cartridge 60 in an attached state to the attachment case 61 supplies ink to the corresponding tank 62. Each channel 63 connects the corresponding cartridge 60 and tank 62. Each tube 64 connects the corresponding tank 62 and the head 21.

Each cartridge 60 includes a liquid chamber 65 and an integrated circuit chip 24 (hereinafter, simply referred to as "IC chip 24") and is formed with an opening 66 and an opening 67. The liquid chamber 65 provides a space for storing ink. The opening 66 is an opening for communicating the liquid chamber 65 with the atmosphere. The opening 67 is configured to be connected to the channel 63. The IC chip 24 includes a memory (not illustrated). The memory (not illustrated) of the IC chip 24 stores the serial number, type information, and the amount of ink storing in the cartridge 60 (hereinafter, referred also to "remaining ink amount". The type information specifies the color of ink stored in the cartridge 60 and an initial ink amount value. The initial ink amount value indicates the amount of ink initially filled in the cartridge 60. Hereinafter, the amount of ink initially filled in the cartridge 60 will be referred to as "initial ink amount".

Each tank 62 includes a liquid chamber 68 and a detected member 73, and is formed with an opening 70. The liquid chamber 68 provides a space for storing ink. The opening 70 is an opening for communicating the liquid chamber 68 with the atmosphere. An internal space of the channel 63 is communicated with the liquid chamber 68.

Supplying ink from the tank 62 to the head 21 decreases the remaining ink amount in the tank 62, lowering the liquid level of the ink in the tank 62. This lowering of the liquid level causes a hydraulic head difference between the liquid chamber 65 and the liquid chamber 68, so that ink flows from the liquid chamber 65 into the liquid chamber 68 through the channel 63. This flow-out of ink into the liquid chamber 68 continues until the hydraulic head difference is eliminated.

The bottom of the liquid chamber 68 is positioned below the liquid chamber 65. Therefore, ink remains in the tank 62 even when the cartridge 60 becomes empty as a result of printing. Accordingly, even after the cartridge 60 becomes empty, the user can perform a printing using the printer 11 until ink remaining in the tank 62 is used up. Further, provided that the user replaces the empty cartridge 60 with a new cartridge 60 by the time the remaining ink in the tank 62 is used up, the user can continuously perform printing.

The detected member 73 includes a float 74, a light blocking portion 75, and a pivot shaft 76. The float 74 is lower in specific gravity than ink. The light blocking portion 75 extends from the float 74. The float 74 pivotally moves about the pivot shaft 76 according to the liquid level of ink in the tank 62.

In a state where the liquid level of ink in the tank 62 is higher than a predetermined height, the light blocking portion 75 is positioned at a predetermined position between a light emitting element and a light receiving element of a liquid level sensor 23 and thus a signal outputted from the liquid level sensor 23 is "L". The predetermined height is the height of the liquid level of ink in the tank 62 at a time when ink in the cartridge 60 runs out as a result of printing (i.e., at a time when the cartridge 60 becomes empty due to printing).

In a state where the liquid level of ink in the tank 62 is equal to or lower than the predetermined height, the light blocking portion 75 is positioned at a position deviated from the predetermined position and thus the signal outputted from the liquid level sensor 23 is "H". Therefore, the signal output from the liquid level sensor 23 changes from "L" to "H" at a time when the cartridge 60 becomes empty.

As illustrated in FIG. 1, the printer 11A further includes a network interface 22 (hereinafter, simply referred to as "network I/F 22"), a display 25, a plurality of remaining sheet amount sensors 26, and a controller 31.

The network I/F 22 is configured to communicate with the PC 12 through the communication network 13. The display 25 displays various kinds of images. The display 25 is an example of the claimed "second display".

Each of the plurality of remaining sheet amount sensors 26 is configured to detect the amount of sheets remaining on the corresponding feeding tray 51. For example, each of the remaining sheet amount sensors 26 is a displacement sensor and outputs a signal whose value corresponds to the position of a corresponding feeding roller 56. Note that the position of the feeding roller 56 changes in accordance with the amount of sheets placed on the corresponding feeding tray 51.

The controller 31 includes a CPU 32, a memory 33, and a communication bus 36. The CPU 32 is a central processing unit that executes programs.

The memory 33 includes a program storage area 34 and a data storage area 35. The program storage area 34 is a read-only memory (ROM), for example. The program storage area 34 stores an operating system 37A (hereinafter, simply referred to as "OS 37A"), a control program 37B, a communication program (not illustrated), and other programs. Hereinafter, these programs may be simply referred to as "program 37".

The OS 37A is a program for controlling executions of other programs such as the control program 37B and the communication program. The control program 37B is a program for executing printing control and display control. The communication program is a program for controlling communications with the PC 12 and other devices. The program 37 is executed by the CPU 32 executing the instructions described in the program 37. Hereinafter, the operations of the program 37 may be described as the operations of the controller 31 or the printer 11A.

In general, the present specification describes processes performed by the CPU 32 according to instructions described in the programs. In other words, processes such as "determine," "extract," "select," "calculate," "decide," "identify," "acquire," "receive," "control," "set," and the like in the following description represent processes performed by the CPU 32. Processes performed by the CPU 32 include processes that control hardware through the OS 37A. The same holds true for the CPU 42, the PC 12, a program 50 (described later), and a controller 41 (described later).

In this specification, the term "acquire" is used under a concept that need not necessarily require a request. Therefore, the process in which the CPU 32 receives data without issuing a request is included in the concept of "the CPU 32 acquires data." Further, "data" in this specification is expressed in bit strings that a computer can read. Further, data of different formats are treated as the same data when the content of the data is essentially the same. Different pieces of data including substantially the same content but in different formats are treated as the same data. The same holds true for "information" in this specification. Further, processes such as "command," "respond," and "request" are implemented by communicating (e.g., transmitting) information specifying a command, response, request, and the like. Further, terms such as "command," "response," "request," and the like may be used also in the sense of information per se which indicates a command, response, request, and the like. The same holds true for the CPU 42, the PC 12, a program 50 (described later), and a controller 41 (described later).

Further, processes performed by the CPU 32 according to instructions described in a program may be described in abbreviated terms, such as "the CPU 32 executes," "the program 37 executes," "the controller 31 executes," or "the printer 11A executes." The same holds true for the CPU 42, the PC 12, a program 50 (described later), and a controller 41 (described later).

Further, a process in which the CPU 32 determines whether information A indicates circumstance B may be described conceptually as "determining whether circumstance B on the basis of information A." A process in which the CPU determines whether information A indicates circumstance B or circumstance C may be described conceptually as "determining whether circumstance B or circumstance C on the basis of information A." The same holds true for the CPU 42, the PC 12, a program 50 (described later), and a controller 41 (described later).

The data storage area 35 is configured of ROM, RAM, EEPROM, a buffer, a portable storage medium (such as a SD card), or any combination of these, for example. The data storage area 35 stores data used for printing and communication.

The communication bus 36 is interconnected with the CPU 32, the memory 33, the head 21, the network I/F 22, the liquid level sensors 23, the IC chips 24, the display 25, the remaining sheet amount sensors 26, motors (not illustrated) of the conveying mechanism 53, and other components. Therefore, in the printer 11A, the controller 31 can communicate with the head 21, the network I/F 22, the liquid level sensors 23, the IC chips 24, the display 25, the remaining sheet amount sensors 26, and the motors of the conveying mechanism 53. The controller 31 can also communicate with the PC 12 through the network I/F 22.

The controller 31 transmits control signals to the motors of the conveying mechanism 53 and to a driving circuit of the head 21 to thereby perform printing processes on a sheet. Specifically, the controller 31 performs a printing process to a sheet by ejecting ink from the head 21 while conveying the sheet. The controller 31 also transmits image data to the display 25 to display an image on the display 25. Further, the controller 31 transmits status information to the PC 12 through the network I/F 22. Detailed description will be made below.

The controller 31 may receive print data from an SD card, the PC 12, or the like. If the printer 11A has a fax function, scan function, and/or copy function, the controller 31 may receive print data by receiving a FAX or copy instructions. After receiving the print data, the controller 31 transmits control signals to the motors and to the driving circuit to thereby perform a printing process.

When the controller 31 has performed a printing process, the controller 31 calculates the amount of ink remaining in each of the cartridges 60 and the amount of ink remaining in each of the tanks 62 on the basis of the amounts of ink used during the printing process (i.e., the amounts of ink consumed in the printing process). Specifically, when the controller 31 has finished a printing process, the controller 31 calculates, for each color, a first remaining amount value and a second remaining amount value. The first remaining amount value indicates the remaining ink amount in the cartridge 60. The second remaining amount value indicates the remaining ink amount in the tank 62.

Next, how the controller 31 calculates the remaining ink amounts will be described for each of the following times or periods of time: a time when a used cartridge 60 already attached to the attachment case 61 is replaced with a cartridge 60; a period of time from the time when the used cartridge 60 is replaced with the cartridge 60 to a time when the signal outputted from the liquid level sensor 23 changes from "L" to "H"; the time when the signal changes from "L" to "H"; and a period of time from the time when the signal changes from "L" to "H" to a time when the cartridge 60 is replaced with another cartridge 60. Note that, as described above, the remaining ink amounts (the first remaining amount value and the second remaining amount value) are calculated for each color: magenta, cyan, yellow, and black.

First, the remaining amount calculations at a time when a used cartridge 60 already attached to the attachment case 61 has been replaced with a cartridge 60 will be described. When a used cartridge 60 already attached to the attachment case 61 has been replaced with a cartridge 60, the controller 31 calculates a new first remaining amount value and a new second remaining amount value.

Specifically, when the controller 31 determines that a cartridge 60 has been newly attached to the attachment case 61, i.e., when the controller 31 determines that a used cartridge 60 has been replaced with a cartridge 60, the controller 31 reads the initial ink amount value from the memory of the IC chip 24 of the cartridge 60 (i.e., the newly attached cartridge 60). This read initial ink amount value indicates the initial ink amount of the cartridge 60.

Subsequently, the controller 31 reads the second remaining amount value from the memory 33. This read second remaining amount value indicates the remaining ink amount in the tank 62 immediately before the attachment of the cartridge 60. Then, the controller 31 calculates a total remaining amount value by adding the read initial ink amount value to the read second remaining amount value.

After calculating the total remaining amount value, the controller 31 calculates, from the calculated total remaining amount value, a new first remaining amount value and a new second remaining amount value. This calculated new first remaining amount value indicates the remaining ink amount in the cartridge 60 at a time when the hydraulic head difference between the cartridge 60 and the tank 62 is eliminated as a result of inflow of ink from the cartridge 60 to the tank 62. Similarly, this calculated new second remaining amount value indicates the remaining ink amount in the tank 62 at the time when the hydraulic head difference between the cartridge 60 and the tank 62 is eliminated as a result of inflow of ink from the cartridge 60 to the tank 62. For example, the controller 31 calculates, using a calculation formula or a table stored in the memory 33, the new first and second remaining amount values from the calculated total remaining amount value.

Finally, the controller 31 overwrites the first and second remaining amount values in the memory 33 with the new first and second remaining amount values, respectively.

Next, the remaining amount calculations in a period of time from the time when the used cartridge 60 is replaced with the cartridge 60 to the time when the signal outputted from the liquid level sensor 23 changes from "L" to "H" will be described. In the period of time from the time when the used cartridge 60 is replaced with the cartridge 60 to the time when the signal outputted from the liquid level sensor 23 changes from "L" to "H", each time the controller 31 has performed a printing process, the controller 31 calculates a new first remaining amount value and a new second remaining amount value.

Specifically, when the controller 31 has finished a printing process, the controller 31 calculates an ejection amount value, which indicates the amount of ink ejected from the head 21 during the printing process (i.e., the amount of ink consumed in the printing process). At this time, the controller 31 also reads the first and second remaining amount values from the memory 33. This read first remaining amount value indicates the remaining ink amount in the cartridge 60 immediately before the start of the printing process. Similarly, this read second remaining amount value indicates the remaining ink amount in the tank 62 immediately before the start of the printing process.

Subsequently, the controller 31 calculates a total remaining amount value by adding the read first remaining amount value and the read second remaining amount value. This calculated total remaining amount value indicates the total remaining ink amount immediately before the start of the printing process.

After calculating the total remaining amount value, the controller 31 calculates a new total remaining amount value by subtracting the calculated ejection amount value from the calculated total remaining amount. This calculated new total remaining amount value indicates the total remaining ink amount immediately after the end of the printing process.

After that, the controller 31 calculates (or determines), from the calculated new total remaining amount, a new first remaining amount value and a new second remaining amount value using the method as described above. This calculated new first remaining amount value indicates the remaining ink amount in the cartridge 60 immediately after the end of the printing process. Similarly, this calculated new second remaining amount value indicates the remaining ink amount in the tank 62 immediately after the end of the printing process.

Finally, the controller 31 overwrites the first and second remaining amount values in the memory 33 with the new first and second remaining amount values, respectively.

Next, the remaining amount calculations at a time when the signal inputted from the liquid level sensor 23 has changed from "L" to "H" will be described. When the signal inputted from the liquid level sensor 23 has changed from "L" to "H", i.e., when the cartridge 60 has become empty, the controller 31 updates (overwrites) the first and second remaining amount values in the memory 33.

Specifically, when the controller 31 determines that the signal inputted from the liquid level sensor 23 has changed from "L" to "H", the controller 31 overwrites the first remaining amount value in the memory 33 with zero (0) and further overwrites the second remaining amount value in the memory 33 with a first predetermined value. The first predetermined value is prestored in the memory 33 (e.g., ROM) and indicates the remaining ink amount in the tank 62 at the time when the cartridge 60 becomes empty.

Next, the remaining amount calculations in the period of time from the time when the signal changes from "L" to "H" to the time when the cartridge 60 is replaced with another cartridge 60 will be described. In the period of time from the time when the signal changes from "L" to "H" to the time when the cartridge 60 is replaced with another cartridge 60, each time the controller 31 has performed a printing process, the controller 31 calculates a new second remaining amount value.

Specifically, when the controller 31 has finished a printing process, calculates an ejection amount value which indicates the amount of ink ejected during in the printing process. At this time, the controller 31 also reads the second remaining amount value from the memory 33. This read second remaining amount value indicates not only the remaining ink amount in the tank 62 immediately before the start of the printing process but also the total remaining ink amount immediately before the start of the printing process.

Subsequently, the controller 31 calculates a new second remaining amount value by subtracting the calculated ejection amount value from the read second remaining amount value. This calculated new second remaining amount value indicates not only the remaining ink amount in the tank 62 immediately after the end of the printing process but also the total remaining ink amount immediately after the end of the printing process.

After that, the controller 31 overwrites the second remaining amount value in the memory 33 with the calculated new second remaining amount value. Finally, the controller 31 determines whether the new second remaining amount value is equal to or greater than a second predetermined value prestored in the memory 33 (e.g., ROM). The second predetermined value is a threshold value for determining whether the remaining ink amount in the tank 62 has decreased to the extent that there may occur a possibility that execution of a printing process causes air to be mixed into ink in the head 21.

Figure 3A:
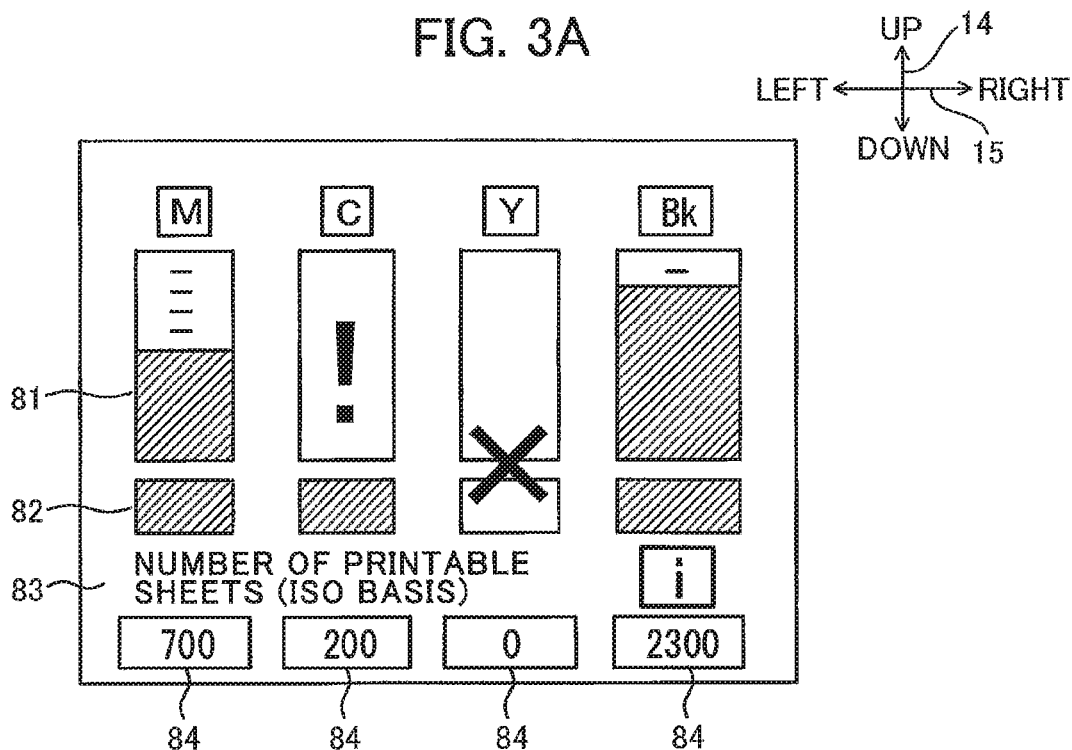
FIG. 3A is a view illustrating a remaining ink amount screen displayed on a display of the printer in the system according to the first embodiment.

Further, the controller 31 is configured to, on the basis of the calculated first and second remaining amount values, set ink levels on first and second remaining ink indicators displayed on a first remaining ink amount screen (FIG. 3A) for each color: magenta, cyan, yellow, and black. The controller 31 is further configured to, on the basis of the calculated first and second remaining amount values, generate status information (described later) including remaining amount information for each color.

Each of the first remaining ink indicators indicates the remaining ink amount in the corresponding cartridge 60. Each of the second remaining ink indicators indicates the remaining ink amount in the corresponding tank 62. Specifically, each of the first and second remaining ink indicators displays thereon ink level incremented or decremented by one (1) in the range of zero (0) to a prescribed maximum number (e.g., ten (10)) to thereby graphically indicate the corresponding remaining ink amount in a plurality of stages.

In the period of time from the time when the used cartridge 60 is replaced with the cartridge 60 to the time when the signal outputted from the liquid level sensor 23 changes from "L" to "H" (i.e., in a period of time from the time when the used cartridge 60 is replaced with the cartridge 60 to a time when the cartridge 60 becomes empty), each time the controller 31 has performed a printing process, the controller 31 calculates, for each of the four colors, a first remaining amount ratio as a percentage and sets the ink level on the first remaining ink indicator according to the calculated first remaining amount ratio. The first remaining amount ratio is calculated by dividing the calculated first remaining amount value by a first initial remaining amount value and multiplying the resultant value by one hundred (100).

The first initial remaining amount value is prestored in the memory 33 and indicates a first initial remaining amount. The first initial remaining amount is the amount of ink remaining in the cartridge 60 when the height of the liquid level of ink in the cartridge 60 and the height of the liquid level of ink in the tank 62 become equal to each other after the cartridge 60 is newly attached to the attachment case 61 with no ink remaining in the tank 62. More specifically, when the cartridge 60 is newly attached to the attachment case 61 with no ink remaining in the tank 62, ink in the cartridge 60 flows into the tank 62 due to a hydraulic head difference therebetween. This inflow of ink into the tank 62 from the cartridge 60 stops when the height of the liquid level of ink in the cartridge 60 and the height of the liquid level of ink in the tank 62 become equal to each other (i.e., when the hydraulic head difference is eliminated). The amount of ink remaining in the cartridge 60 at the time when the height of the liquid level of ink in the cartridge 60 and the height of the liquid level of ink in the tank 62 become equal to each other in the aforementioned scenario is the above-described first initial remaining amount.

When the set ink level on the first remaining ink indicator is zero (0) and the signal outputted from the liquid level sensor 23 is "L", the controller 31 changes the ink level on the first remaining ink indicator from zero (0) to one (1). In other words, until the signal outputted from the liquid level sensor 23 changes from "L" to "H", the level on the first remaining ink indicator on the display 25 is at least one (1).

The controller 31 sets the ink level on the first remaining ink indicator to zero (0) during the period of time from a time when the output of the liquid level sensor 23 is changed from "L" to "H" to a time when the cartridge 60 is replaced.

On the other hand, until the signal outputted of the liquid level sensor 23 changes from "L" to "H", the controller 31 sets the ink level on the second remaining ink indicator to the maximum (e.g., ten (10)).

During the period of time from the time when the signal outputted from the liquid level sensor 23 is changed from "L" to "H" to the time when the cartridge 60 is replaced, the controller 31 sets the ink level on the second remaining ink indicator according to a second remaining amount ratio (%). The controller 31 calculates the second remaining amount ratio by dividing the calculated second remaining amount value by the first predetermined value and multiplying the resultant value by one hundred (100). As described above, the first predetermined value is prestored in the memory 33 and indicates the amount of ink remaining in the tank 62 at a time the cartridge 60 becomes empty.

Further, the controller 31 also calculates the number of printable sheets (ISO basis) and the number of printable sheets (consumption basis) on the basis of the calculated first and second remaining amount values. The number of printable sheets (ISO basis) and the number of printable sheets (consumption basis) are calculated for each color: magenta, cyan, yellow, and black.

The controller 31 calculates a total remaining amount value by adding the calculated first remaining amount value to the calculated second remaining amount value, and then calculates the number of printable sheets (ISO basis) by dividing the calculated total remaining amount value by a standard consumption value. The standard consumption value indicates an ink consumption amount per sheet when a printing process is performed using a test method prescribed by the International Organization for Standardization (ISO). The method in which the number of printable sheets (ISO basis) is calculated by dividing the total remaining amount value by the standard consumption value is an example of the claimed "first calculation method". The number of printable sheets (ISO basis) is an example of the claimed "first number of printable sheets" and is also an example of the claimed "first information". The standard consumption value is an example of the claimed "first value".

Each time the controller 31 has performed a printing process, the controller 31 calculates an average consumption value and stores the calculated average consumption value in the memory 33. The average consumption value indicates an average ink consumption amount per sheet and is used to calculate the number of printable sheets (consumption basis). Specifically, each time the controller 31 has finished a printing process, the controller 31 accumulates both the amount of ink ejected from the head 21 during the printing process and the number of sheets printed during the printing process. The controller 31 divides the accumulated amount of ink ejected from the head 21 by the accumulated number of sheets printed to thereby calculate an average consumption value per sheet. The controller 31 then stores the calculated average consumption value in the memory 33.

The controller 31 calculates a total remaining amount value by adding the calculated first remaining amount value to the calculated second remaining amount value, and then calculates the number of printable sheets (consumption basis) by dividing the calculated total remaining amount value by the average consumption value. The method in which the number of printable sheets (consumption basis) is calculated by dividing the total remaining amount value by the average consumption value is an example of the claimed "second calculation method". The number of printable sheets (consumption basis) is an example of the claimed "second number of printable sheets" and is also an example of the claimed "second information". The average consumption value is an example of the claimed "second value".

The controller 31 determines, for each of the feeding trays 51, the remaining sheet amount on the basis of the signal inputted from the corresponding remaining sheet amount sensor 26. Specifically, the controller 31 selects, from a table prestored in the memory 33, the remaining sheet amount which corresponds to the inputted signal and determines the selected remaining sheet amount as the amount of sheet remaining in the feeding tray 51.

The controller 31 displays the first remaining ink amount screen (FIG. 3A) or a second remaining ink amount screen (not illustrated) with the ink levels on the remaining ink indicators and the calculated number of printable sheets. Whether the first remaining ink amount screen or the second remaining ink amount screen is displayed depends on the user's selection.

Specifically, the controller 31 receives a user's selection through an input interface (not illustrated) and displays on the display 25 the remaining ink amount screen selected by the user. More specifically, the controller 31 displays, on the display 25, one of the first remaining ink amount screen (FIG. 3A) and the second remaining ink amount screen (not illustrated) on the basis of a first printer-display setting. The first display setting is a setting as to whether to display the number of printable sheets (ISO basis) or the number of printable sheets (consumption basis) on the display 25 (i.e., a setting as to whether to display the first remaining ink amount screen or the second remaining ink amount screen). The controller 31 sets the first printer-display setting to one of an ISO-basis setting and a consumption-basis setting on the basis of the user's selection through the input interface. The input interface is, for example, a touch sensor placed over the display 25.

The first remaining ink amount screen includes four objects 81, four objects 82, an object 83, and four objects 84. Each of the objects 81 represents the first remaining ink indicator for the corresponding color. Each of the objects 82 represents the second remaining ink indicator for the corresponding color. The object 83 is a text "number of printable sheets (ISO basis)". Each of the objects 84 represents the number of printable sheets for the corresponding color.

Of the four objects 81, one object 81 represents the amount of ink remaining in the cartridge 60 for magenta, another object 81 for cyan, another object 81 for yellow, and the other object 81 for black.

Of the four objects 82, one object 82 represents the amount of ink remaining in the tank 62 for magenta, another object 82 for cyan, another object 82 for yellow, and the other object 82 for black.

Of the four objects 84, one object 84 represents the number of printable sheets (ISO basis) for the remaining amount of magenta ink, another object 84 for cyan ink, another object 84 for yellow ink, and the other object 84 for black ink.

The second remaining ink amount screen (not illustrated) is different from the first remaining ink amount screen in that the second remaining ink amount screen (not illustrated) includes a text object "number of printable sheets (consumption basis)" in place of the text object 83 "number of printable sheets (ISO basis)". Further, each of the objects 84 on the second remaining ink amount screen represent the number of printable sheets (consumption basis) for the corresponding color, in place of the number of printable sheets (ISO basis). The second remaining ink amount screen is similar to the first remaining ink amount screen in other respects.

Each time the controller 31 has performed a printing process (i.e., each time the controller 31 has finished a printing process), the controller 31 generates status information. The status information includes a plurality of pieces of information calculated each time the controller 31 has performed a printing process. Specifically, the status information includes, for each color (magenta, cyan, yellow, and black), the first remaining amount ratio, the second remaining amount ratio, the number of printable sheets (ISO basis), and the number of printable sheets (consumption basis) which are calculated each time the controller 31 has performed a printing process. The status information further includes remaining sheet information indicating the amount of sheets remaining on each of the feeding trays 51 calculated each time the controller 31 has performed a printing process. When the signal outputted from the liquid level sensor 23 has changed from "L" to "H" during or after execution of a printing process, the status information also includes, for each of the four colors, sensor information indicating that the signal outputted from the liquid level sensor 23 has changed from "L" to "H". The controller 31 transmits the generated status information to the PC 12 through the network I/F 22. The first remaining amount ratio is an example of the claimed "first information". The second remaining amount ratio is an example of the claimed "first information". The number of printable sheets (ISO basis) is an example of the claimed "first information", whereas the number of printable sheets (consumption basis) is an example of the claimed "second information".

The printer 11B illustrated in FIG. 1 is a color inkjet printer, similarly to the printer 11A. Although the printer 11B includes the cartridges 60 similarly to the printer 11A, the printer 11B does not include the tanks 62. Further, unlike the printer 11A, the printer 11B is not capable of calculating the number of printable sheets. Accordingly, the printer 11B is configured to display, instead of the first and second remaining ink amount screens, a remaining ink amount screen (not illustrated) which does not include the objects concerning the amount of ink remaining in the tank 62 or the number of printable sheets. That is, the remaining ink amount screen displayed by the printer 11B includes the objects 81 but does not include the objects 82, 83, or 84. The printer 11B is identical to the printer 11A in other respects.

The controller 31 of the printer 11B generates status information and transmits the generated status information to the PC 12 through the network I/F 22. The status information generated in the printer 11B includes the number of remaining sheets for each of the feeding trays 51 and the first remaining amount ratio for each color: magenta, cyan, yellow, and black and. The first remaining amount ratio is an example of the claimed "second information".

The printer 11C is a monochrome inkjet printer. While the printer 11C includes the cartridge 60 storing black ink, the printer 11C includes neither the tanks 62 nor the cartridges 60 storing magenta, cyan, and yellow ink. Further, the printer 11C is capable of neither calculating the number of printable sheets nor the number of remaining sheets. The printer 11C is identical to the printer 11A in other respects.

The controller 31 of the printer 11C generates status information and transmits the generated status information to the PC 12 through the network I/F 22. The status information generated in the printer 11C includes the percentage of the first remaining amount for black ink.

The PC 12 includes a controller 41, the display 46, an input device 47, and a network I/F 48. The display 46 and the network I/F 48 are similar in configuration to the display 25 and the network I/F 22 of the printer 11A, respectively. The display 46 is an example of the claimed "first display".

The PC 12 may be a tablet. When the PC 12 is a tablet, the network I/F 48 performs wireless communication using the Wi-Fi communication standard, for example. The input device 47 is, for example, a keyboard, a mouse, or a touch sensor placed over the display 46. The PC 12 communicates with the printers 11 through an access point provided in the communication network 13, for example. The input device 47 is an example of the claimed "user interface".

The controller 41 includes the CPU 42, a memory 43, and a communication bus 49. The CPU 42 and the communication bus 49 are similar in configuration to the CPU 32 and the communication bus 36, respectively. The CPU 42 is an example of the claimed "processor".

The memory 43 includes a program storage area 44 and a data storage area 45. The program storage area 44 is a hard disk, for example. The program storage area 44 stores an OS 50A, a control program 50B, a communication program (not illustrated), a connection diagnostic-and-repair program (not illustrated), and other programs. Hereinafter, these programs may be simply referred to as "program 50". The memory 43 is an example of the claimed "memory".

The OS 50A is a program for controlling executions of other programs such as the control program 50B and the communication program. The control program 50B functions as a so-called status monitor. Specifically, the control program 50B is a program for displaying the status of the printer 11 on the display 46 on the basis of the status information transmitted from one of the printers 11. The communication program is a program for controlling communication with the printers 11 and other devices. The connection diagnostic-and-repair program is a program for attempting to recover communication with a communication device such as the printer 11 by diagnosing the status of the communication device and reassigning the correct IP address, for example. The program 50 is executed by the CPU 42 executing the instructions described in the program 50. Hereinafter, the operation of the program 50 may be described as the operation of the controller 41 or the PC 12. The control program 50B is an example of the claimed "computer-readable instructions".

The data storage area 45 is a hard disk, a RAM, or the like. The data storage area 45 stores a registry file. In the registry file, identification information, model name, and printer name which are information for distinguishing the printers 11 from one another are registered in association with each other for each of the printers 11. The registry file is a registry of Windows (registered trademark), for example. When a printer driver of one of the printers 11 is installed in the PC 12, an installation program adds the identification information, model name, and printer name of the one of the printers 11 to the registry file, for example. The model name is an example of the claimed "printer information".

The identification information includes the IP address, MAC address, and the like of the printer 11. The model name is information indicating the model of the printer 11. The printer name is a nickname assigned to the printer 11 in order for the user to easily identify the printer 11. The model name may be used as the printer name. For example, for distinguishing a plurality of printers 11 having the same model from one another, the model name accompanied by a distinguishable character string such as "copy 1" may be used as the printer name. The identification information, the model name, and the printer name may be registered in the registry file using a method other than installation programs.

Figure 8A:
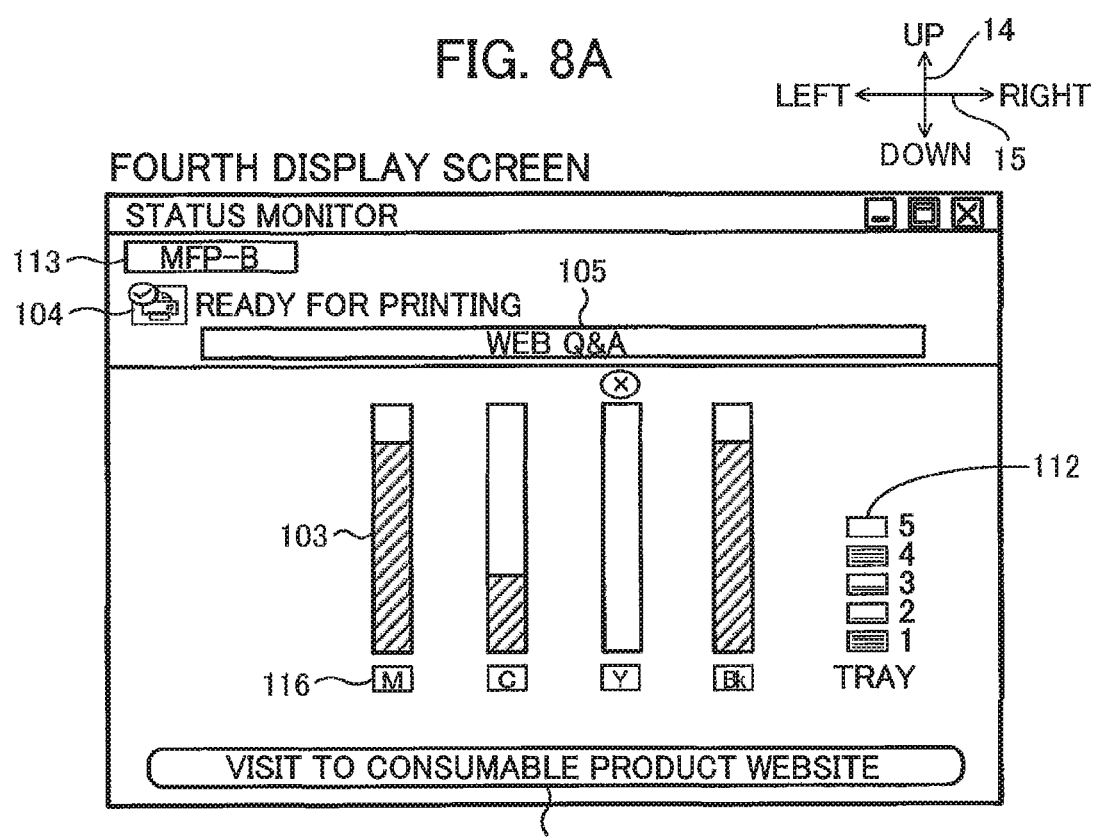
FIG. 8A is a view illustrating a fourth display screen displayed on the display of the PC in the system according to the first embodiment.
Figure 8B:
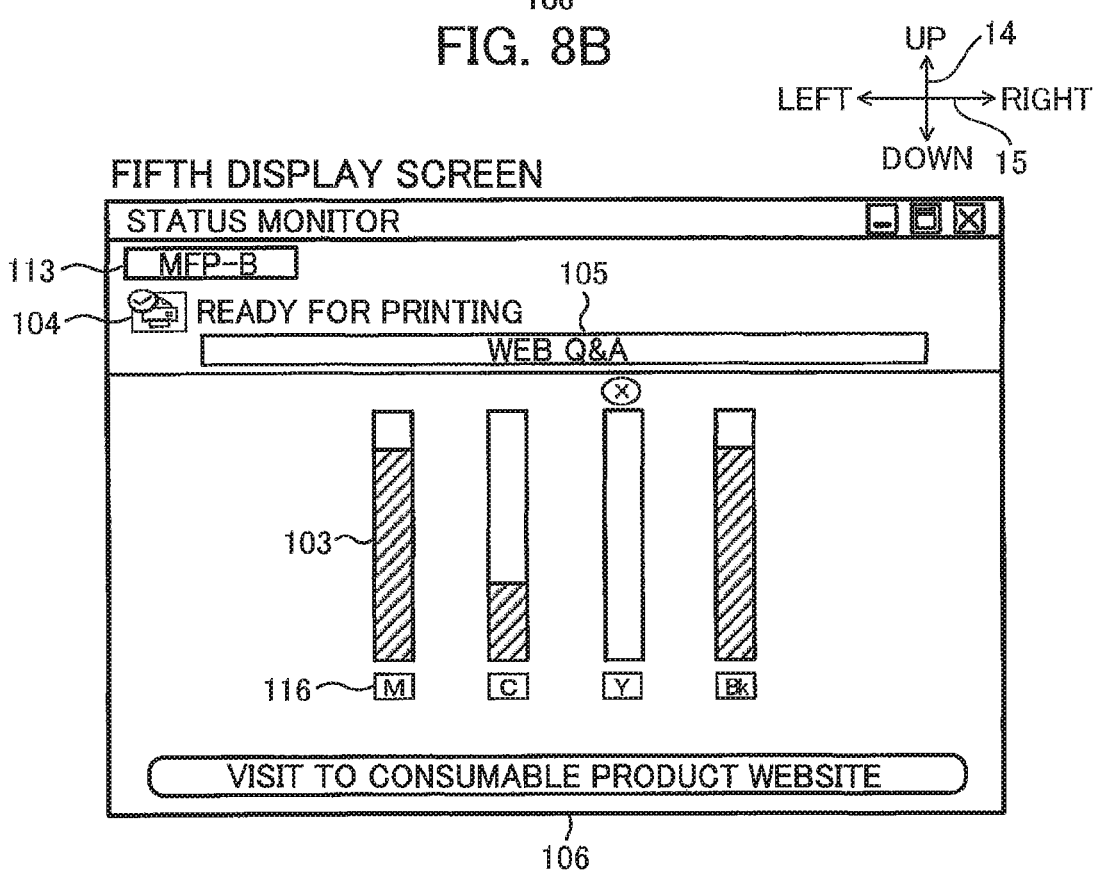
FIG. 8B is a view illustrating a fifth display screen displayed on the display of the PC in the system according to the first embodiment.
Figure 9A:
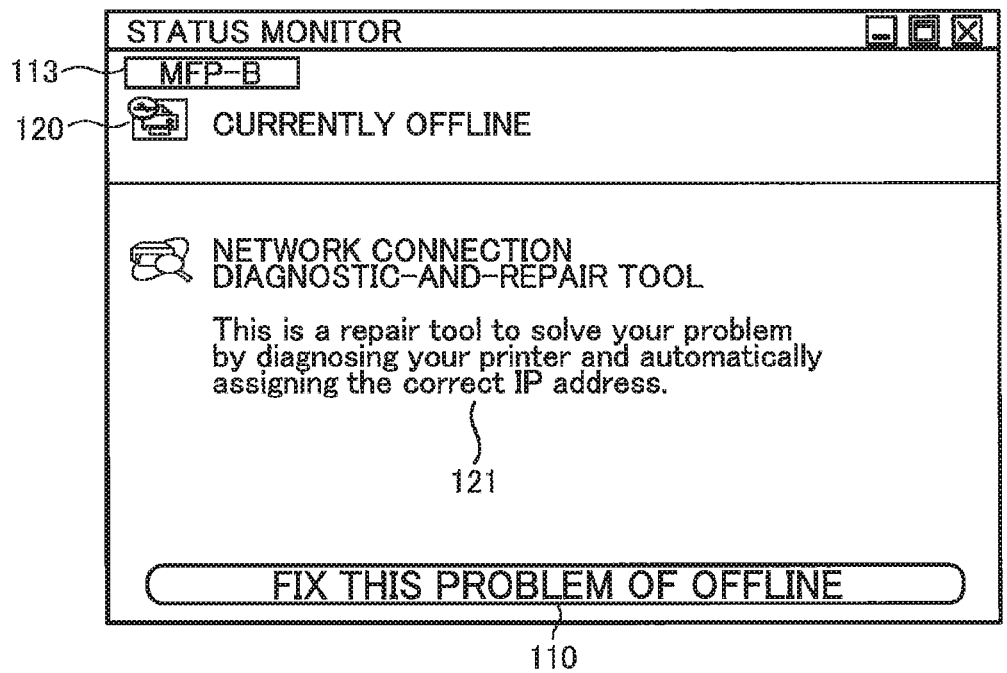
FIG. 9A is a view illustrating a first error screen displayed on the display of the PC in the system according to the first embodiment.
Figure 9B:
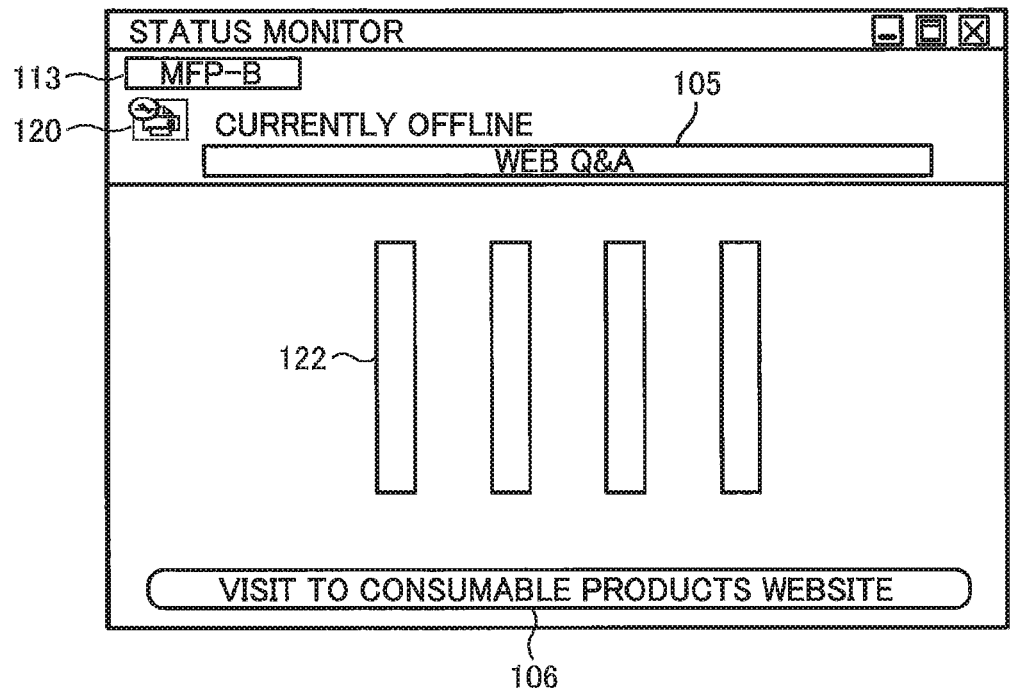
FIG. 9B is a view illustrating a second error screen displayed on the display of the PC in the system according to the first embodiment.

The data storage area 45 stores a plurality of types of screen formats (FIGS. 7A to 8B) and a plurality of types of error screens (FIGS. 9A and 9B).

The memory 43 may be a computer-readable storage medium. The computer-readable storage medium is a non-transitory medium. Examples of the non-transitory medium include a recording medium such as a compact disc read-only memory (CD-ROM) and a digital versatile disc-read only memory (DVD-ROM) in addition to the above-described medium. The non-transitory medium is also a tangible medium. On the other hand, electric signals that convey programs downloaded from a server or the like on the Internet are a computer-readable signal medium, which is one type of computer-readable medium but is not considered a non-transitory computer-readable storage medium.

Figure 4:
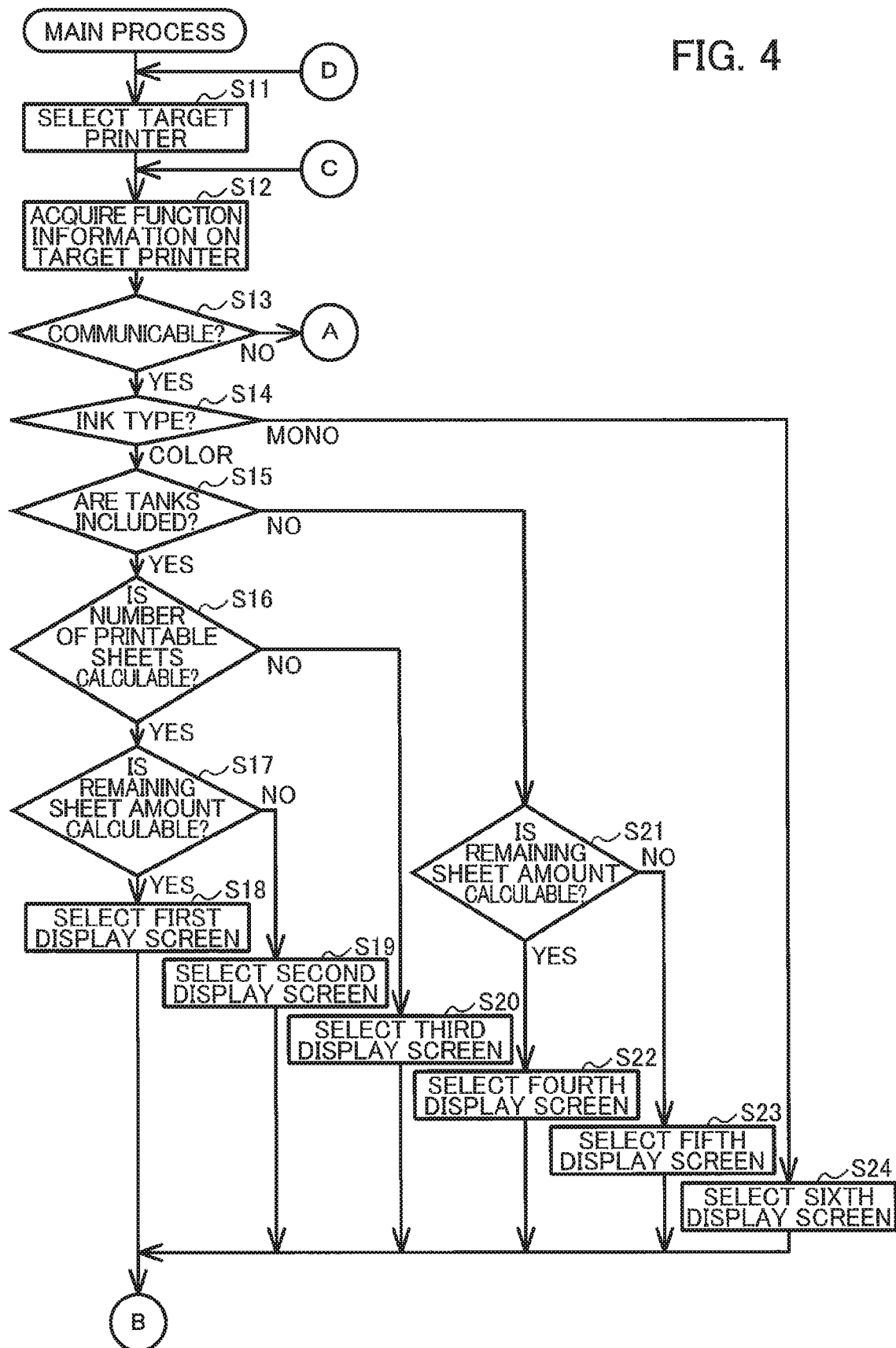
FIG. 4 is a part of a flowchart illustrating steps in a main process executed by a controller of the PC in the system according to the first embodiment.

The controller 41 executes a main process illustrated in FIG. 4. In S11, the controller 41 determines a target printer. The target printer is a printer 11 whose status is to be displayed on the display 46. For example, in S11, the controller 41 displays, on the display 46, printer names registered in the registry file, and receives a user's selection. The controller 41 sets the target printer to the printer 11 specified by the printer name selected by the user. The controller 41 then stores in the memory 43, as target printer information, information indicating that the target printer has been set to the printer 11 specified by the printer name selected by the user. The target printer information indicates the target printer, i.e., the printer 11 set as the target printer. Alternatively, in S11, the controller 41 receives information specifying the printer 11 to which the PC 12 has transmitted print data. The controller 41 then sets the target printer sets to the printer 11 specified by the received information. Alternatively, in S11, the controller 41 sets the target printer to the printer 11 specified by the printer name which has been already stored in the memory 43 as the target printer.

In S12, the controller 41 acquires function information on the target printer (i.e., function information on the printer 11 set as the target printer). From the model name of the target printer, for example, the controller 41 determines whether the target printer is capable of transmitting the function information.

When the controller 41 determines that the target printer is capable of transmitting the function information, the controller 41 transmits, using the identification information of the target printer (e.g., using the identification information as a destination address), a request information to the target printer. The request information is information requesting the target printer to transmit the function information thereon. Subsequently, the controller 41 receives the function information which is transmitted, as a response to the request information, from the target printer.

On the other hand, when the controller 41 determines that the target printer is not capable of transmitting the function information, the controller 41 reads and acquires, from the memory 43, the function information corresponding to the model name of the target printer. Note that, a list in which the model name and the function information corresponding thereto (the function information on the printer 11 specified by the model name) are associated with each other for each model name is prestored in the memory 43.

In S13, the controller 41 determines whether the controller 41 can communicate with the target printer (i.e., whether a communication with the target printer can be established). For example, the controller 41 transmits request information to the target printer using the identification information thereof registered in the registry file. When the controller 41 receives an acknowledgement (ACK) from the target printer as a response to the transmitted request information, the controller 41 determines that the controller 41 can communicate with the target printer (S13: Yes). On the other hand, when the controller 41 does not receive the ACK from the target printer, the controller 41 determines that the controller 41 is unable to communicate with the target printer (S13: No).

When the controller 41 determines that the controller 41 can communicate with the target printer (S13: Yes), in S14 the controller 41 determines, from the acquired function information, whether the target printer is a color printer or a monochrome printer. When the controller 41 determines that the target printer is a color printer (S14: COLOR), in S15 the controller 41 determines, from the acquired function information, whether the target printer includes the tanks 62.

When the controller 41 determines that the target printer includes the tanks 62 (S15: Yes), in S16 the controller 41 determines, from the acquired function information, whether the target printer is capable of calculating the number of printable sheets (i.e., whether the target printer has a function of calculating the number of printable sheets). When the controller 41 determines that the target printer is capable of calculating the number of printable sheets (S16: Yes), in S17 the controller 41 determines, from the acquired function information, whether the target printer is capable of calculating the remaining sheet amount (i.e., whether the target printer has a function of calculating the remaining sheet amount).

When the controller 41 determines that the target printer is capable of calculating the remaining sheet amount (S17: Yes), in S18 the controller 41 selects, from among the plurality of types of screen formats stored in the memory 43, a screen format for a first display screen illustrated in FIG. 7A. Subsequently, the controller 41 set the selected screen format as a target screen format. The target screen format is a screen format to be displayed on the display 46.

Figure 7A:
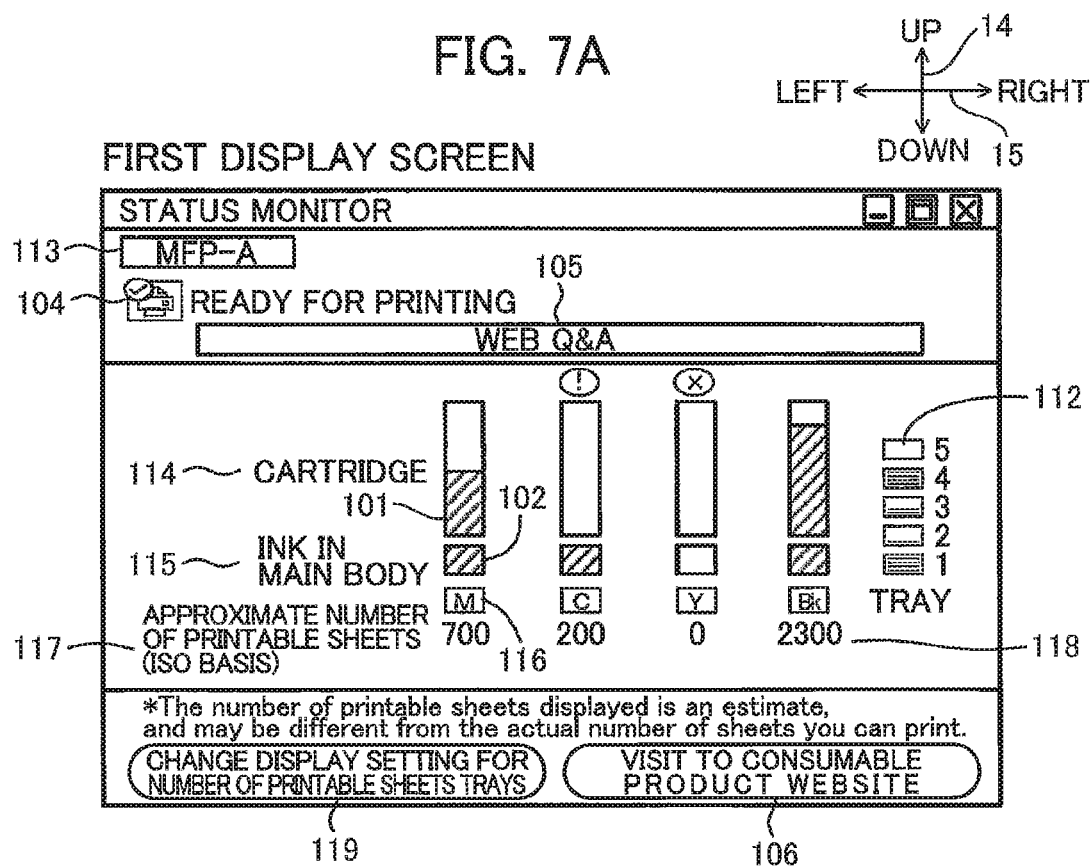
FIG. 7A is another view illustrating the first display screen displayed on the display of the PC in the system according to the first embodiment.

As illustrated in FIG. 7A, the first display screen includes a thirteenth object 113, a fourth object 104, and a fifth object 105. The thirteenth object 113 is a text indicating the model name. The fourth object 104 includes a picture of the printer 11 and a text "ready for printing". The fifth object 105 is a text icon with a text "Web Q&A". The fourth object 104 on the first display screen illustrated in FIG. 7A is an example of the claimed "fourth object". The fifth object 105 on the first display screen illustrated in FIG. 7A is an example of the claimed "fifth object".

The thirteenth object 113 is positioned at the upper left portion of the display 46 in an up-down direction 14 and a left-right direction 15. The fourth object 104 is positioned below the thirteenth object 113. The fifth object 105 is positioned below the fourth object 104. The up-down direction 14 is an example of the claimed "first direction", whereas the left-right direction 15 is an example of the claimed "second direction".

The first display screen further includes a fourteenth object 114, a fifteenth object 115, four first objects 101, four second objects 102, and four sixteenth objects 116. The fourteenth object 114 is a text "cartridge". The fifteenth object 115 is a text "ink in main body". The four first objects 101 correspond to respective ones of the four colors: magenta, cyan, yellow, and black. Each of the four first objects 101 represents the amount of ink remaining in the one of the cartridges 60 (hereinafter, also referred to as "cartridge remaining amount") which stores the corresponding color. Each of the second objects 102 represents the amount of ink remaining in the corresponding the one of the tanks 62 (hereinafter also referred to as "tank remaining amount") which stores the corresponding color. The sixteenth objects 116 are characters "M", "C", "Y", and "Bk" each representing the corresponding color of ink. The first object 101 is an example of the claimed "first object" and is also an example of the claimed "second object". The second object 102 is an example of the claimed "second object".

The fourteenth object 114 is positioned at the left portion of the display 46 and below the fifth object 105. The fifteenth object 115 is positioned below the fourteenth object 114.

The four first objects 101 are positioned rightward of the fourteenth object 114 and arranged in the left-right direction 15. The four second objects 102 are positioned rightward of the fifteenth object 115 and arranged in the left-right direction 15. The first objects 101 and the second objects 102 are arranged in the up-down direction 14. Specifically, each of the four second objects 102 is positioned directly below the corresponding one of the four first objects 101. In other words, each of the four first objects and the one of the four second objects 102 for the same color are arranged in the up-down direction 14.

The four first objects 101 are cartridge-ink indicators indicating the remaining ink amounts in the cartridges 60. Each of the four first objects 101 (i.e., each of the four cartridge-ink indicators) indicates the remaining ink amount in the cartridge 60 storing the corresponding color ink. Specifically, each of the first objects 101 displays thereon cartridge-ink level incremented or decremented by one (1) in the range of zero (0) to a prescribed maximum number (e.g., ten (10)) to thereby graphically indicate the remaining ink amount of the corresponding cartridge 60 in a plurality of stages.

The second objects 102 are tank-ink indicators indicating the remaining ink amounts in the tanks 62. Each of the four second objects 102 (i.e., each of the four tank-ink indicators) is configured to indicates the remaining ink amount in the tank 62 for storing the corresponding color ink. Specifically, each of the second objects 102 displays thereon tank-ink level incremented or decremented by one (1) in the range of zero (0) to a prescribed maximum number (e.g., ten (10)) to thereby graphically indicate the remaining ink amount of the corresponding tank 62 in a plurality of stages.

In a display update process (S31) described later, the cartridge-ink level on the cartridge-ink indicator of each of the first objects 101 is determined according to the amount of ink remaining in the corresponding cartridge 60. In addition, the tank-ink level on the tank-ink indicator of each of the second objects 102 is determined according to the amount of ink remaining in the corresponding tank 62.

The sixteenth objects 116 are arranged in the left-right direction 15 and positioned below the second objects 102. Specifically, each of the four sixteenth objects 116 is positioned directly below the corresponding one of the four second objects 102. Each sixteenth object 116 represents the color of the remaining ink amounts indicated by the corresponding pair of the first object 101 and the second object 102 arranged in the up-down direction 14. The characters "M", "C", "Y", and "Bk" are arranged in the left-right direction 15 in the same order as the characters "M", "C", "Y", and "Bk" on the remaining ink amount screen (e.g., FIG. 3A) in the printer 11A. In other words, the remaining ink amounts on the PC 12 are displayed in the same order as the remaining ink amounts on the printer 11A.

The first display screen further includes a plurality of twelfth objects 112. Each of the twelfth objects 112 is a picture representing the remaining sheet amount in the corresponding feeding tray 51. The twelfth objects 112 are arranged in the up-down direction 14 and positioned rightward of the rightmost pair of the first object 101 and the second object 102. The twelfth object 112 is an example of the claimed "twelfth object".

The first display screen further includes a seventeenth object 117 and four eighteenth objects 118. The seventeenth object 117 is a text "approximate number of printable sheets (ISO basis)". The four eighteenth objects 118 correspond to respective ones of the four color: magenta, cyan, yellow, and black. Each of the four eighteenth objects 118 is a numeral indicating the number of printable sheets for the corresponding color. The eighteenth object 118 is an example of the claimed "first object".

The seventeenth object 117 is positioned leftward of the leftmost sixteenth object 116. The eighteenth objects 118 are positioned below the sixteenth objects 116. Specifically, each of the four eighteenth objects 118 is positioned directly below the sixteenth object 116 indicating the corresponding color.

The first display screen further includes a nineteenth object 119 and a sixth object 106. The nineteenth object 119 is a text icon with a text "change display setting for the number of printable sheets". The sixth object 106 is a text icon with a text "visit the consumable products website". The nineteenth object 119 is positioned at the left portion of the display 46 and below the seventeenth object 117. The sixth object 106 is positioned rightward of the nineteenth object 119 and below the eighteenth objects 118. The term "icon" denotes an object causing a screen of the display 46 to be changed to another screen when the object is selected using the input device 47 such as a mouse. The sixth object 106 on the first display screen illustrated in FIG. 7A is an example of the claimed "sixth object".

Referring back to FIG. 4, when in S17 the controller 41 determines that the target printer is not capable of calculating the remaining sheet amount (S17: No), in S19 the controller 41 selects a screen format for a second display screen illustrated in FIG. 7B from among the plurality of types of screen formats stored in the memory 43, and sets the target screen format to the selected screen format (i.e., the screen format for the second display screen).

Figure 7B:
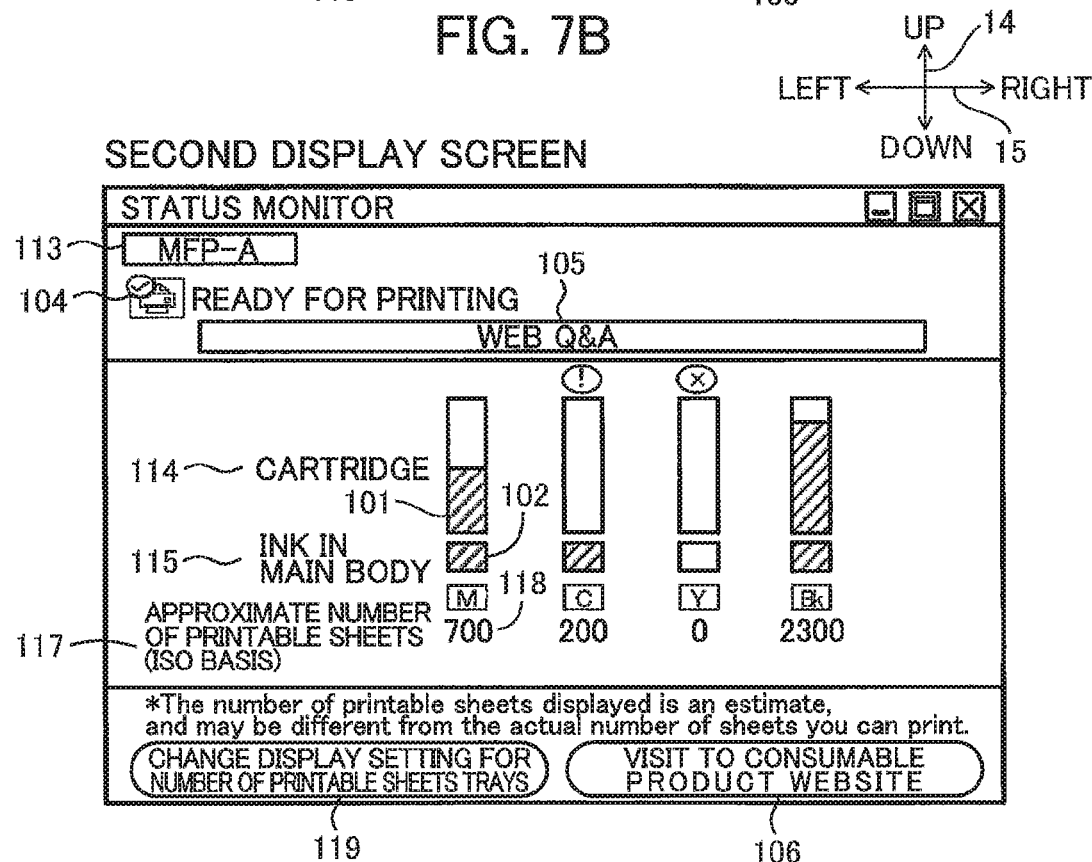
FIG. 7B is a view illustrating a second display screen displayed on the display of the PC in the system according to the first embodiment.

As illustrated in FIG. 7B, unlike the first display screen, the second display screen does not include the plurality of twelfth objects 112 which are the pictures each representing the remaining sheet amount in the corresponding feeding tray 51. The second display screen is similar, in other respects, to the first display screen illustrated in FIG. 7A.

Referring back to FIG. 4, when in S16 the controller 41 determines that the target printer is not capable of calculating the number of printable sheets (S16: No), in S20 the controller 41 selects a screen format for a third display screen (not illustrated) from among the plurality of types of screen formats stored in the memory 43, and sets the target screen format to the selected screen format (i.e., the screen format for the third display screen).

Unlike the second display screen, the third display screen includes neither the seventeenth object 117 (i.e., the text "approximate number of printable sheets (ISO basis)") nor the four eighteenth objects 118 (i.e., the numerals indicating the numbers of printable sheets). The third display screen is similar, in other respects, to the second display screen illustrated in FIG. 7B. The first, second, and third display screens are each an example of the claimed "first screen".

In the first embodiment, referring back to FIG. 4, when in S16 the controller 41 determines that the target printer is not capable of calculating the number of printable sheets (S16: No), the controller 41 determines the third display screen, which does not include the twelfth objects 112 representing the remaining sheet amounts, as the target screen format without determining whether the target printer is capable of calculating the remaining sheet amount. This is because there does not exist a type of printer 11 that includes the tanks 62 and is not capable of calculating the number of printable sheets but is capable of calculating the remaining sheet amount. When there exists such a type of printer 11, the controller 41 may determine the target screen format after determining whether the target printer is capable of calculating the remaining sheet amount.

When in S15 the controller 41 determines that the target printer does not include the tanks 62 (S15: No), in S21 the controller 41 determines whether the target printer is capable of calculating the remaining sheet amount, similarly to the process in S17. When the controller 41 determines in S21 that the target printer is capable of calculating the remaining sheet amount (S21: Yes), in S22 the controller 41 selects a screen format for a fourth display screen illustrated in FIG. 8A from among the plurality of types of screen formats stored in the memory 43, and set the target screen format to the selected screen format (i.e., the screen format for the fourth display screen).

As illustrated in FIG. 8A, the fourth display screen includes the thirteenth object 113, the fourth object 104, the fifth object 105, the twelfth objects 112, the sixteenth objects 116, and the sixth object 106, similarly to the first display screen (FIG. 7A). The display positions on the fourth display screen of the thirteenth object 113, the fourth object 104, the fifth object 105, the twelfth objects 112, the sixteenth objects 116, and the sixth object 106 are approximately the same as those on the first display screen (FIG. 7A). The fourth object 104 on the fourth display screen is an example of the claimed "seventh object". The fifth object 105 on the fourth display screen is an example of the claimed "eighth object". The sixth object 106 on the fourth display screen is an example of the claimed "ninth object".

The fourth display screen further includes four third objects 103, instead of the first objects 101 and second objects 102 on the first display screen. The four third objects 103 correspond to respective ones of the four colors: magenta, cyan, yellow, and black. The third objects 103 are arranged in the left-right direction 15 and positioned above the sixteenth objects 116 that are the characters "M", "C", "Y", and "Bk". Specifically, each of the four third objects 103 is positioned directly above the one of the four sixteenth objects 116 which indicates the corresponding color. The third object 103 is an example of the claimed "second object".

The third objects 103 are cartridge-ink indicators indicating the remaining ink amounts in the cartridge 60. Each of the four third objects 103 (i.e., each of the four cartridge-ink indicators) represents the remaining ink amount in the cartridge 60 storing the corresponding color ink. Specifically, each of the third objects 103 displays thereon cartridge-ink level incremented or decremented by one (1) in the range of zero (0) to a prescribed maximum number (e.g., ten (10)) to thereby graphically indicate the remaining ink amount of the corresponding cartridge 60 in a plurality of stages. In the display update process (S31) described later, the cartridge-ink level on the cartridge-ink indicator of each of the third objects 103 is determined according to the remaining ink amount in the corresponding cartridge 60.

When the controller 41 determines in S21 that the target printer is not capable of calculating the remaining sheet amount (S21: No), in S23 the controller 41 selects a screen format for a fifth display screen illustrated in FIG. 8B from among the plurality of types of screen formats stored in the memory 43, and sets the target screen format to the selected screen format (i.e., the screen format for the fifth display screen).

As illustrated in FIG. 8B, unlike the fourth display screen, the fifth display screen does not include the twelfth objects 112 that are the pictures each representing the remaining sheet amount in the corresponding feeding tray 51. The fifth display screen is similar, in other respects, to the fourth display screen illustrated in FIG. 8A. The fourth display screen and the fifth display screen are each an example of the claimed "second screen".

In the first embodiment, referring back to FIG. 4, when the controller 41 determines in S15 that the target printer does not include the tanks 62 (S15: No), the controller 41 sets the target screen format to the fourth display screen or the fifth display screen without determining whether the target printer is capable of calculating the number of printable sheets. This is because there does not exist a type of printer 11 that does not include the tanks 62 but is capable of calculating the number of printable sheets. When there exists such a type of printer 11, the controller 41 may set the target screen format after determining whether the target printer is capable of calculating the number of printable sheets.

Referring back to FIG. 4, when the controller 41 determines in S14 that the target printer is a monochrome printer (S14: MONO), in S24 the controller 41 selects a screen format for a sixth display screen (not illustrated) from among the plurality of types of screen formats stored in the memory 43, and sets the target screen format to the selected screen format (i.e., the screen format for the sixth display screen).

For example, unlike the fifth display screen in FIG. 8B, the sixth display screen includes neither the third objects 103 nor the sixteenth objects 116 for magenta, cyan, and yellow. The sixth display screen is similar, in other respects, to the fifth display screen.

In the first embodiment, referring back to FIG. 4, when the controller 41 determines in S14 that the target printer is a monochrome printer (S14: MONO), the controller 41 sets the sixth display screen as the target screen format without determining whether the target printer includes the tanks 62, whether the target printer is capable of calculating the number of printable sheets, or whether the target printer is capable of calculating the remaining sheet amount. This is because there are neither a type of monochrome printer 11 that includes the tanks 62, a type of monochrome printer 11 that is capable of calculating the number of printable sheets, nor a type of monochrome printer 11 that is capable of calculating the remaining sheet amount. When there are such monochrome printers 11, the controller 41 may set the target screen format after determining whether the target printer includes the tanks 62, whether the target printer is capable of calculating the number of printable sheets, or whether the target printer is capable of calculating the remaining sheet amount.

Figure 5A:
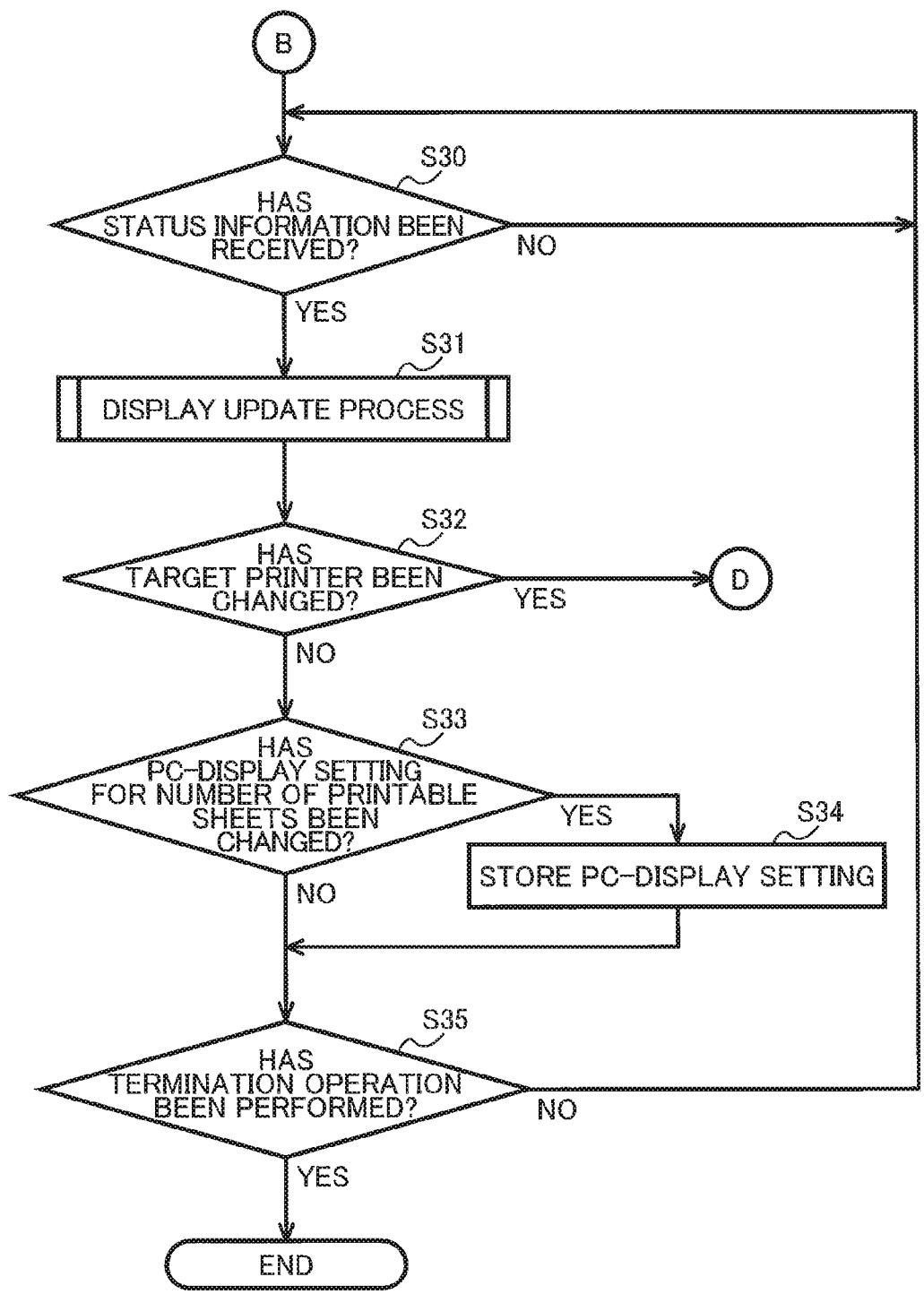
FIG. 5A is a part of the flowchart illustrating steps in the main process executed by the controller of the PC in the system according to the first embodiment.

After in S18, S19, S20, S22, S23, or S24 the controller 41 sets the target screen format, as illustrated in FIG. 5A, in S30 the controller 41 waits until receiving status information (S30: NO). When the controller 41 receives the status information (S30: Yes), in S31 the controller 41 executes the display update process.

As illustrated in FIG. 6A, in S41 the controller 41 determines, from the remaining amount information included in the received status information; the cartridge-ink level on the cartridge-ink indicator of the first object 101 for each color and the tank-ink level on the tank-ink indicator of the second object 102 for each color; or the cartridge-ink level on the cartridge-ink indicator of the third objects 103 for each color. In S41, the controller 41 then sets (or updates), for each color, the ink levels on these ink indicators on the target screen format. The first remaining amount ratio and the second remaining amount ratio are each an example of the remaining amount information.

Note that, in this description, one of the four first objects 101 which corresponds to black ink is referred also to as "first object 101K", and one of the four second objects 102 which corresponds to black ink is referred also to as "second object 102K", one of the four objects 81 which corresponds to black ink is referred also to as "object 81K", and one of the four objects 82 which corresponds to black ink is referred also to as "object 82K".

The detailed description of the process in S41 will be made below. In the following description to the process of S41, the target screen format is assumed to be the first display screen.

In S41, the controller 41 determines the cartridge-ink level on the first object 101K according to the first remaining amount ratio about black ink included in the received status information. For example, in a case where the prescribed maximum number of the cartridge-ink level is set to ten (10), in response to the first remaining amount ratio about black ink being 11%, the controller 41 determines that the cartridge-ink level to be displayed on the first object 101K is two (2).

Subsequently, the controller 41 determines whether the number determined above as the cartridge-ink level is zero (0) and further determines whether the received status information includes the sensor information about black ink.

When the controller 41 determines that the determined number as the cartridge-ink level is zero (0) and the status information does not include the sensor information about black ink, the controller 41 changes the determined number as the cartridge-ink level from zero (0) to one (1) and sets the cartridge-ink level on the first object 101K to the changed number, i.e., to one (1).

When the determined number is not zero (0), the controller 41 sets the cartridge-ink level on the first object 101K to the determined number. Also when the determined number is zero and the received status information includes the sensor information, the controller 41 sets the cartridge-ink level on the first object 101K to the determined number.

In this manner, the controller 41 sets the cartridge-ink level on the first object 101K. As a result, the cartridge-ink level on the first object 101K in the PC 12 always matches the ink level on the object 81K in the printer 11A. Note that, the cartridge-ink level on each of the other three first objects 101 is determined and set similarly to the above.

When the controller 41 determines that the status information does not include the sensor information about black ink, the controller 41 determines that the tank-ink level on the second objects 102K is the prescribed maximum number (e.g., ten (10)), and then sets the tank-ink level on the second objects 102K to the determined number. When the controller 41 determines that the status information includes the sensor information about black ink, the controller 41 determines the tank-ink level on the second objects 102K according to the second remaining amount ratio about black ink included in the status information. For example, in response to the second remaining amount ratio about black ink being 21%, the controller 41 determines that the tank-ink level on the second object 102K is three (3). Then, the controller 41 sets the tank-ink level on the second objects 102K to the determined number.

In this manner, the controller 41 sets the tank-ink level on the second object 102K. As a result, the tank-ink level on the second object 102K in the PC 12 always matches the ink level on the object 82K in the printer 11A. Note that, the tank-ink level on each of the other three second objects 102 is determined and set similarly to the above.

In S42 the controller 41 determines, from the acquired function information, whether the target printer is capable of calculating the number of printable sheets. When the controller 41 determines that the target printer is not capable of calculating the number of printable sheets (S42: No), in S46 the controller 41 displays the target screen format on the display 46 with the set cartridge-ink levels and the set tank-ink levels (the updated cartridge-ink levels and the updated tank-ink levels), and ends the display update process.

When the controller 41 determines that the target printer is capable of calculating the number of printable sheets (S42: Yes), in S43 the controller 41 determines whether the setting for display of the number of printable sheets is "ISO basis" or "consumption basis".

The controller 41 receives a PC-display setting from the user through the nineteenth object 119 (FIG. 7A) displayed on the display 46. The PC-display setting is a setting as to whether to display, on the display 46, the number of printable sheets (ISO basis) or the number of printable sheets (consumption basis). The PC-display setting is set to one of an ISO-basis setting or a consumption-basis setting by the user. When the PC-display setting is set to the ISO-basis setting, the number of printable sheets (ISO basis) is displayed for each color on the display 46. On the other hand, when the PC-display setting is set to the consumption-basis setting, the number of printable sheets (consumption basis) is displayed for each color on the display 46.

Specifically, when the user selects the nineteenth object 119 using the input device 47 such as a mouse, a selection screen (not illustrated) appears on the display 46. On the selection screen, the user can select one of the ISO-basis setting or the consumption-basis setting as the PC-display setting. The selection screen includes a text explaining the number of printable sheets (ISO basis) and a text explaining the number of printable sheets (consumption basis).

When the controller 41 receives one selected by the user between the ISO-basis setting and the consumption-basis setting, the controller 41 sets the PC-display setting to the received one setting and stores the same in the memory 43. Note that the initial setting for the PC-display setting is the ISO-basis setting and stored in the memory 43. Until the user selects the consumption-basis setting, the ISO-basis setting is stored in the memory 43.

When in S43 the controller 41 determines that the PC-display setting is the ISO-basis setting (S43: ISO basis), in S44 the controller 41 determines to include the seventeenth object 117 "approximate number of printable sheets (ISO basis)" in the target screen format (e.g., the first display screen illustrated in FIG. 7A or the second display screen illustrated in 7B) and updates, for each color, the eighteenth object 118 with the corresponding number of printable sheets (ISO basis) included in the received status information. In S46, the controller 41 displays the updated target screen format on the display 46 and ends the display update process.

Figure 3B:
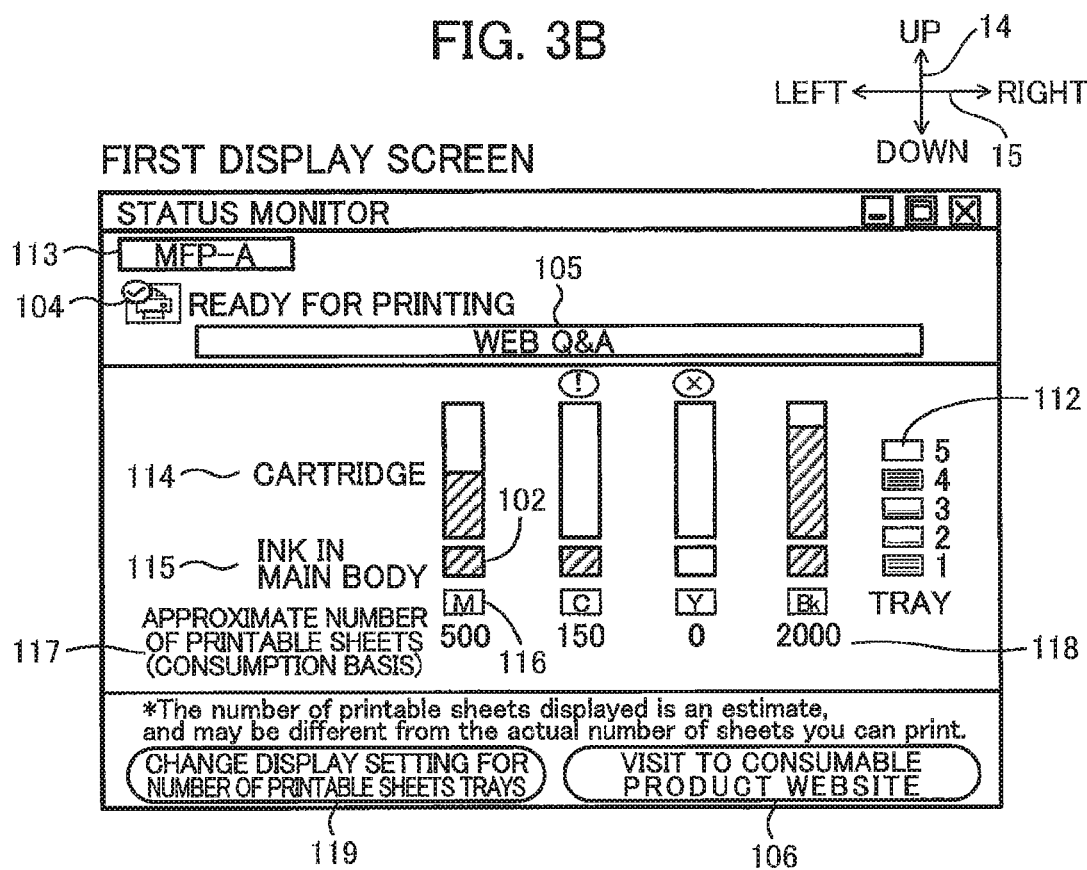
FIG. 3B is a view illustrating a first display screen displayed on a display of a PC in the system according to the first embodiment.

When in S43 the controller 41 determines that the PC-display setting is the consumption-basis setting (S43: consumption basis), in S45 the controller 41 determines to include the seventeenth object 117 "approximate number of printable sheets (consumption basis)" in the target screen format (e.g., the first display screen illustrated in FIG. 3B) and updates, for each color, the eighteenth object 118 with the corresponding number of printable sheets (consumption basis) included in the received status information. In S46, the controller 41 displays the updated target screen format on the display 46 and ends the display update process. The eighteenth object 118 on the first display screen illustrated in FIG. 3B is an example of the claimed "third object". The first display screen illustrated in FIG. 3B is an example of the claimed "second screen".

As described above, the controller 41 displays the number of printable sheets "ISO basis" or "consumption basis" according to the PC-display setting in the PC 12, not according to the printer-display setting in the target printer. That is, even when the target printer is changed from one printer 11 to another printer 11 (i.e., even when the printer 11 whose status is to be displayed is changed), the PC-display setting for display of the number of printable sheets in the PC 12 is not changed.

Referring back to FIG. 5A, when in S31 the controller 41 ends the display update process, in S32 the controller 41 determines whether the target printer has been changed. When the controller 41 determines that the target printer has been changed (S32: Yes), the controller 41 executes the process in S11 (FIG. 4) again. When the controller 41 determines that the target printer has not been changed (S32: No), in S33 the controller 41 determines whether the PC-display setting has been changed.

When the controller 41 determines that the PC-display setting has been changed (S33: Yes), in S34 the controller 41 stores the changed setting in the memory 43, i.e., the controller 41 overwrites the PC-display setting in the memory 43 with the changed setting. When the controller 41 determines that the PC-display setting has not been changed (S33: No), the controller 41 skips the process in S34 and proceeds to the process in S35.

In S35, the controller 41 determines whether the user has performed an input operation instructing to end the main process. When the controller 41 determines that the user has performed the input operation instructing to end the main process (S35: Yes), the controller 41 ends the main process. When the controller 41 determines that the user has not performed the input operation instructing to end the main process (S35: No), the controller 41 executes the process in S30 and waits until receiving new status information.

Figure 5B:
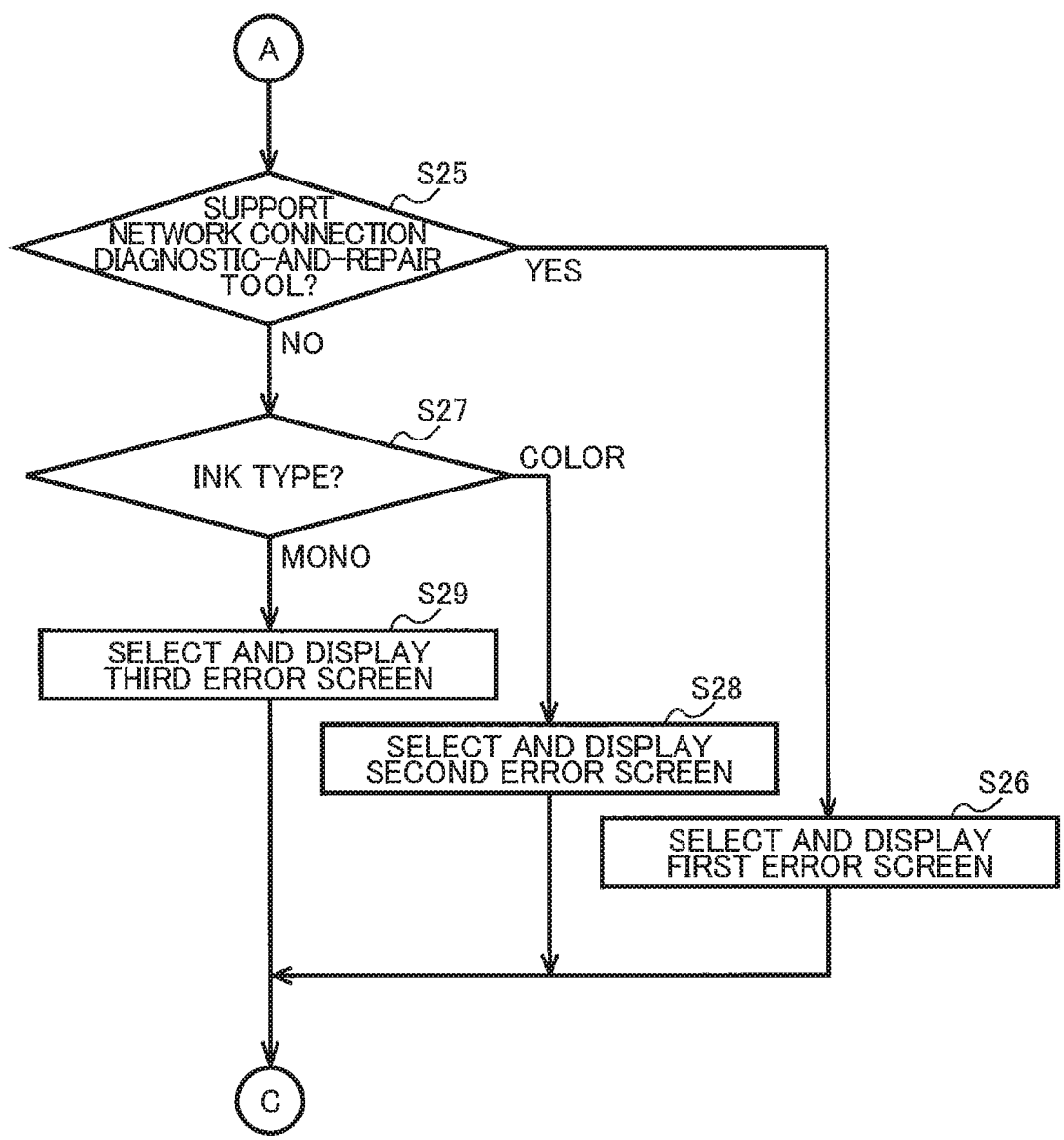
FIG. 5B is a part of the flowchart illustrating steps in the main process executed by the controller of the PC in the system according to the first embodiment.

Referring to FIG. 5B, a process in a case where the controller 41 is unable to communicate with the target printer will be described. When in S13 (FIG. 4) the controller 41 determines that the controller 41 is unable to communicate with the target printer (S13: No), in S25 (FIG. 5B) the controller determines, from the acquired function information, whether the target printer is a type of printer 11 that is capable of recovering communication with the controller 41 using the connection diagnostic-and-repair program (what is called a network connection diagnostic-and-repair tool). In other words, in S25 the controller determines, from the acquired function information, whether the target printer supports the network connection diagnostic-and-repair tool.

When the controller 41 determines that the target printer supports the network connection diagnostic-and-repair tool (S25: Yes), in S26 the controller 41 selects a first error screen illustrated in FIG. 9A from the plurality of types of error screens stored in the memory 43, and determined the first error screen as a target error screen. The target error screen is an error screen to be displayed on the display 46.

As illustrated in FIG. 9A, the first error screen includes the thirteenth object 113, similarly to the first display screen (FIG. 7A). The first error screen also includes a twentieth object 120, instead of the fourth object 104 and fifth object 105 on the first display screen. The twentieth object 120 includes a picture of the printer 11 and a text "currently offline".

The first error screen also includes a twenty-first object 121 and a tenth object 110, instead of the objects on the first display screen which represent the remaining ink amount, the remaining sheet amount, the number of printable sheets, and other information. Specifically, the first error screen also includes the twenty-first object 121 and the tenth object 110, instead of the first objects 101, the second objects 102, the sixth object 106, the twelfth objects 112, and the fourteenth object 114 to the nineteenth object 119 on the first display screen. The twenty-first object 121 includes a text "network connection diagnostic-and-repair tool" and a text "this is a repair tool to solve your problem by diagnosing your printer and automatically assigning the correct IP address". The tenth object 110 is an icon with text "fix this problem of offline". The first error screen illustrated in FIG. 9A is an example of the claimed "third error screen".

Although not illustrated in the flowchart in FIG. 5B, the controller 41 determines whether the user has selected the tenth object 110 using the input device 47 such as a mouse. When the controller 41 determines that the user has selected the tenth object 110, the controller 41 executes the connection diagnostic-and-repair program.

After the controller 41 displays the first error screen on the display 46, the controller 41 executes the processes in and after S12 (FIG. 4) again.

Referring back to FIG. 5B, when in S25 the controller 41 determines that the target printer is not a type of printer 11 that is capable of recovering communication with the controller 41 using the connection diagnostic-and-repair program (S25: No), in S27 the controller 41 determines whether the target printer is a color printer or a monochrome printer.

When the controller 41 determines that the target printer is a color printer (S27: COLOR), in S28 the controller 41 selects a second error screen illustrated in FIG. 9B from the plurality of types of error screens stored in the memory 43, determines the second error screen as the target error screen, and display the second error screen on the display 46.

As illustrated in FIG. 9B, the second error screen includes the thirteenth object 113, the fifth object 105, and the sixth object 106, similarly to the fourth display screen (FIG. 8A). The second error screen also includes the twentieth object 120, instead of the fourth object 104 on the fourth display screen.

The second error screen also includes four twenty-second objects 122, instead of the objects on the fourth display screen which represent the remaining ink amount, the remaining sheet amount, and other information. Specifically, the second error screen also includes the four twenty-second objects 122, instead of the third objects 103, the twelfth objects 112, and the sixteenth objects 116 on the fourth display screen. The twenty-second objects 122 are rectangles long in the up-down direction 14 and arranged in the left-right direction 15. The twenty-second objects 122 indicate that the PC 12 is unable to communicate with the target printer and therefore unable to acquire information on the remaining amount of magenta, cyan, yellow, and black ink from the target printer.

Although not illustrated in the flowchart in FIG. 5B, the controller 41 determines whether the user has selected the fifth object 105 using the input device 47 such as a mouse. When the controller 41 determines that the user has selected the fifth object 105, the controller 41 displays another screen on the display 46. This screen informs the user of a predetermined procedure for recovering communication with the target printer. The fifth object 105 on the second error screen is an example of the claimed "eleventh object".

After the controller 41 displays the second error screen on the display 46, the controller 41 executes the processes in and after S12 (FIG. 4) again.

On the other hand, when in S27 the controller 41 determines that the target printer is a monochrome printer (S27: MONO), in S29 the controller 41 selects a third error screen (not illustrated) from the plurality of types of error screens stored in the memory 43, determines the third error screen as the target error screen, and display the third error screen on the display 46.

The third error screen includes a single rectangular object, instead of the four twenty-second objects 122 on the second error screen (FIG. 9B). The third error screen is similar, in other respects, to the second error screen. The rectangular object indicates that the PC 12 is unable to communicate with the target printer and therefore unable to acquire information on the remaining amount of black ink from the target printer. The second and third error screens are each an example of the claimed "fourth error screen".

After the controller 41 displays the third error screen on the display 46, the controller 41 executes the processes in and after S12 (FIG. 4) again.

In the first embodiment, in order to determine which error screen to display on the display 46, after the process in S25 (FIG. 5B), the controller 41 determines only whether the target printer is a color printer or a monochrome printer. This minimizes the types of error screens stored in the memory 43. However, the controller 41 may also determine whether the target printer includes the tanks 62. In this case, two more types of error screens are prestored in the memory 43; One error screen is selected when the target printer includes the tanks 62 and the other error screen is selected when the target printer does not include the tanks 62.

In the first embodiment, when the received status information includes both the first remaining amount ratio and the second remaining amount ratio, the controller 41 displays, on the display 46, any one of the first display screen, the second display screen, and the third display screen which include the first objects 101 representing the remaining ink amounts in the cartridges 60 and the second objects 102 representing the remaining ink amounts in the tanks 62. When the received status information includes the first remaining amount ratio but does not include second remaining amount ratio, the controller 41 displays, on the display 46, one of the fourth display screen and the fifth display screen which include the third objects 103 representing the remaining ink amounts in the cartridges 60. With this configuration, when the status information is received from the printer 11A including both the cartridges 60 and the tanks 62 and also when from the printer 11B including the cartridges 60 but not the tanks 62, it is possible to make the user properly recognize properly the received status information.

In the first embodiment, unless the target printer is changed, the controller 41 continues displaying the target screen in which the status information is reflected without again selecting the target screen format. That is, in the first embodiment, unless the target printer is changed, the controller 41 does not again select the target screen format even when receiving the status information. Accordingly, the first embodiment can more improve the program processing speed of the controller 31 than the configuration in which the controller selects one screen format as the target screen format from among the plurality of types of screen formats each time receiving the status information. As a result, the received status information is displayed more quickly, and the load on the program processing is reduced.

In the first embodiment, the controller 41 selects and displays an error screen (the second error screen or the third error screen) from the plurality of types of error screens. Accordingly, in the first embodiment, the controller 41 can display the error screen corresponding to the type of the target printer, such as a color printer or a monochrome printer.

In the first embodiment, when the target printer includes the tanks 62, the controller 41 displays any one of three display screens, namely, the first display screen, the second display screen, and the third display screen. Each of the three display screens includes the four first objects 101 representing the remaining ink amounts in the four cartridges 60 for four colors (magenta, cyan, yellow, and black) and the four second objects 102 representing the remaining ink amounts in the four tanks 62 for the four colors. On each of the three display screens, each of the four second objects 102 is positioned below the corresponding first object 101 representing the same color. In other words, on the three display screens, for each color, the first object 101 and second object 102 which represent the same color are arranged in the up-down direction 14. With this arrangement, the user can easily recognize how much ink remains in the cartridge 60 and how much ink remains in the tank 62 for each color.

In the first embodiment, on each of the three display screen (i.e., the first, second, and third display screens), the four first objects 101 are arranged in the left-right direction 15 and the four second objects 102 are also arranged in the left-right direction 15. With this arrangement, the user can easily understand which object represents the remaining ink amount in the cartridge 60 and which object represents the remaining ink amount in the tank 62.

In the first embodiment, when the target printer includes the cartridges 60 but does not include the tanks 62, the controller 41 displays one of two display screens, namely, the fourth display screen and the fifth display screen. On each of the two display screens, the four third objects 103 are arranged in the left-right direction 15, similarly to the four first objects 101 on the first display screen. In other words, the arrangement of the objects representing the remaining ink amounts of the cartridges 60 when the target printer is the printer 11A including the tanks 62 is the same as that when the target printer is the printer 11B not including the tanks 62. Accordingly, compared with the configuration in which the arrangement of these objects is changed between when the target printer is the printer 11A and when the target printer is the printer 11B, the first embodiment can make the user more easily recognize how much ink remains in the cartridges 60.

In the first embodiment, on each of the three display screens (i.e., the first, second, and third display screens), the fourth object 104, the fifth object 105, the first objects 101, the second objects 102, and the sixth object 106 are arranged in the up-down direction 14. The four first objects 101 are arranged in the left-right direction 15, and the four second objects 102 are arranged in the left-right direction 15. Accordingly, the status of the target printer, troubleshooting, remaining ink amounts, and information on the cartridges are arranged in the up-down direction 14, while the remaining ink amounts of the cartridges 60 and the remaining ink amounts of the tanks 62 are arranged for each color in the left-right direction 15. This arrangement can the user easily recognize each information.

In the first embodiment, on each of the two display screens (i.e., the fourth display screen for the printer 11B not including the tanks 62 and the fifth display screen), the fourth object 104, the fifth object 105, the third objects 103, and the sixth object 106 are arranged in the up-down direction 14, similarly to the first display screen displayed for the printer 11A including the tanks 62. Accordingly, compared with the configuration in which the arrangement of these objects is changed between when the target printer is the printer 11A including the tanks 62 and when the target printer is the printer 11B not including the tanks 62, the first embodiment can make the user more easily recognize how much ink remains in the cartridges 60.

In the first embodiment, when the target printer supports the network connection diagnostic-and-repair tool, the controller 41 displays the first error screen on which the user can instruct to execute the connection diagnostic-and-repair program. When the target printer does not support the network connection diagnostic-and-repair tool, the controller 41 displays one of two error screen, namely, the second error screen and the third error screen which are capable of transitioning to another screen for recovering the communication. This configuration can make the user recognize proper means for recovering the communication, regardless of whether the target printer supports the network connection diagnostic-and-repair tool.

In the first embodiment, the twelfth objects 112 representing the remaining sheet amounts and the first objects 101 and second objects 102 representing the remaining ink amounts are arranged in the left-right direction 15. With this arrangement, the user can check information on the consumables (ink and sheets) just by moving the eyes in the left-right direction 15. As a result, the user can easily grasp the information on the consumables.

In the first embodiment, when the received status information does not include the sensor information, the controller 41 changes and sets the cartridge-ink level on the first object 101 to one (1) even when the determined number as the cartridge-ink level is zero (0). This can make the cartridge-ink level displayed on the PC 12 match the ink level displayed on the printer 11A. As a result, the user does not feel a lack of consistency between these two displays.

In the first embodiment, the controller 41 receives both the number of printable sheets (ISO basis) and the number of printable sheets (consumption basis) from the target printer and the user can select, using the input device 47, which one to display of the number of printable sheets (ISO basis) and the number of printable sheets (consumption basis). The controller 41 displays the selected one of the number of printable sheets (ISO basis) and the number of printable sheets (consumption basis), regardless of whether the target printer is displaying the number of printable sheets (ISO basis) or the number of printable sheets (consumption basis). This configuration can prevent the number of printable sheets on the display 46 from being changed from "ISO basis" to "consumption basis" or from "consumption basis" to "ISO basis" each time the target printer is changed. That is, the number of printable sheets selected by the user is always displayed on the display 46 of the PC 12. Accordingly, the user can easily recognize whether the displayed number of printable sheets is "ISO basis" or "consumption basis". Moreover, the user is not forced to select "ISO basis" or "consumption basis" each time the target printer is changed, thereby saving the user from doing troublesome labors for the setting operation.

Second Embodiment

In the first embodiment, the controller 41 displays the number of printable sheets "ISO basis" or "consumption basis" according to the PC-display setting in the PC 12, not according to the first printer-display setting in the target printer. In the second embodiment, when the user has not performed the PC-display setting in the PC 12, the controller 41 displays the number of printable sheets "ISO basis" or "consumption basis" according to the first printer-display setting in the target printer. The second embodiment is identical to the first embodiment except the configurations and processes described below.

In addition to the configurations described in the first embodiment, the printer 11A according to the second embodiment further has a function that the user can perform a second printer-display setting as to whether or not to display the number of printable sheets on the display 25. The second printer-display setting is set to one of: a display-on setting in which the number of printable sheets is displayed on the display 25; and a display-off setting in which the number of printable sheets is not displayed on the display 25. For example, a display switching object (not illustrated) is displayed on the remaining ink amount screen (e.g., FIG. 3A). The user selects one of the display-on setting and the display-off setting by tapping the display switching object, and the controller 41 sets the second printer-display setting to the one selected by the user.

In the second embodiment, the status information transmitted from the printer 11A to the PC 12 further includes display setting information. The display setting information includes information indicating whether the second display setting is set to the display-on setting or the display-off setting. When the second printer-display setting is set to the display-on setting, the display setting information further includes information indicating whether the first printer-display setting is set to the ISO basis setting or the consumption-basis setting. Note that, similarly to the first embodiment, the status information transmitted from the printer 11A of the second embodiment also includes the first remaining amount ratio, the second remaining amount ratio, the number of printable sheets (ISO basis), the number of printable sheets (consumption basis), and other information. The number of printable sheets (ISO basis) is an example of the claimed "first information", the number of printable sheets (consumption basis) is an example of the claimed "second information", and the display setting information is an example of the claimed "third information".

Figure 10:
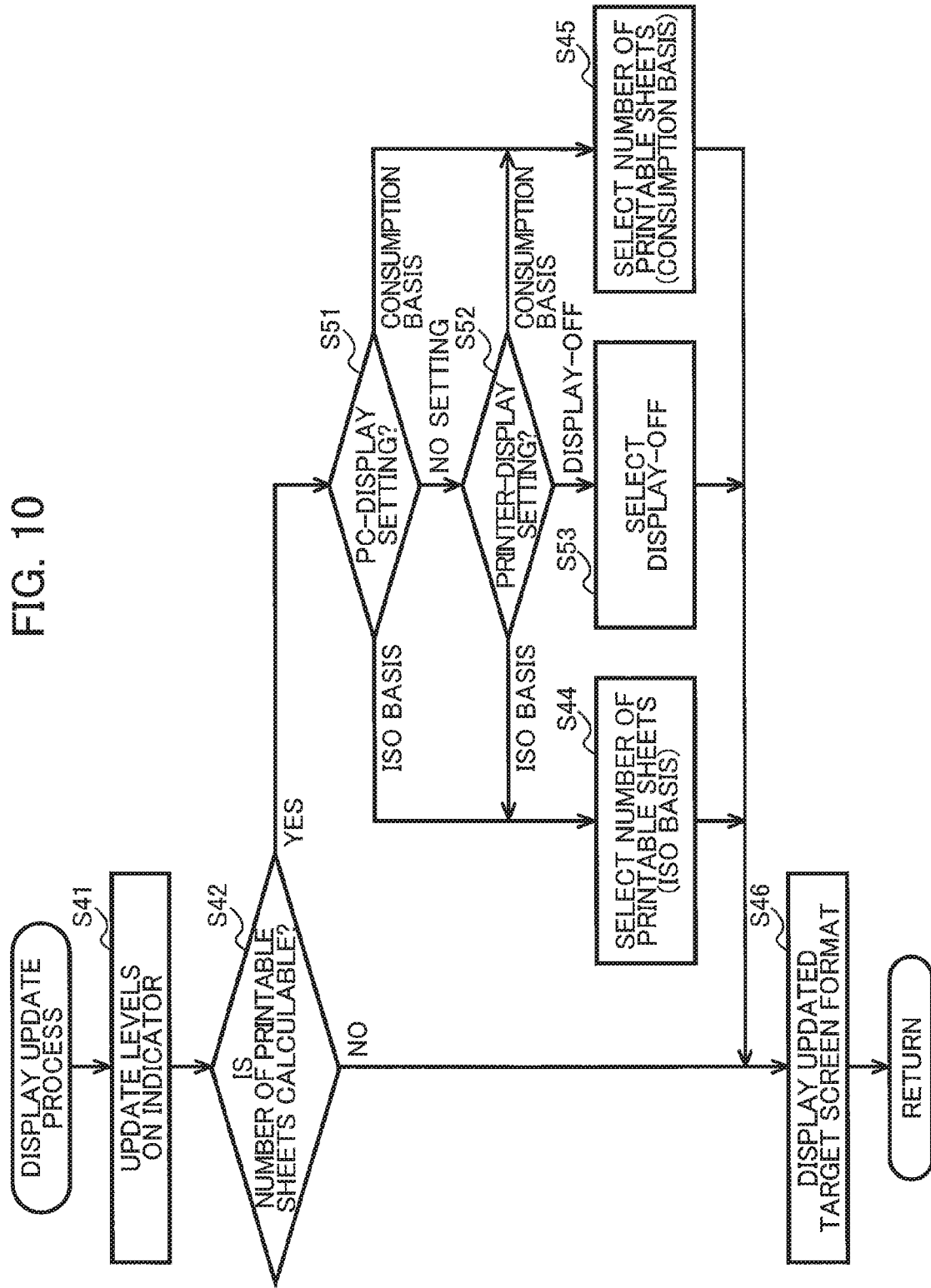
FIG. 10 is a flowchart illustrating steps in a display update process executed by a controller of a PC in a system according to a second embodiment.

The controller 41 in the second embodiment executes a display update process illustrated in FIG. 10, instead of the display update process illustrated in FIG. 6A. The target screen format is assumed to be the first display screen. In the display update process in FIG. 10, the steps identical to those in FIG. 6A are designated with the same reference numerals to avoid duplicating descriptions.

When in S42 the controller 41 determines that the target printer is capable of calculating the number of printable sheets (S42; Yes), in S51 the controller 41 determines whether or not the PC-display setting has been set (i.e., whether or not the user has performed the PC-display setting) and whether the PC-display setting has been set to the ISO-basis setting or the consumption-basis setting (i.e., which one of the ISO-basis setting and the consumption-basis setting has been selected by the user as the PC-display setting).

When the controller 41 determines that the PC-display setting has been set to the ISO-basis setting (S51: ISO basis), in S44 the controller 41 determines to include the seventeenth object 117 "approximate number of printable sheets (ISO basis)" in the first display screen (FIG. 7A) and updates the eighteenth objects 118 with the number of printable sheets (ISO basis) included in the received status information.

When the controller 41 determines that the PC-display setting has been set to the consumption-basis setting (S51: consumption basis), in S45 the controller 41 determines to include the seventeenth object 117 "approximate number of printable sheets (consumption basis)" in the first display screen (FIG. 3B) and updates the eighteenth objects 118 with the number of printable sheets (consumption basis) included in the received status information. The first display screen illustrated in FIG. 7A is an example of the claimed "first screen", whereas the first display screen illustrated in FIG. 3B is an example of the claimed "second screen".

When the controller 41 determines that the PC-display setting has not been set (S51: not set), in S52 the controller 41 determines, from the display setting information included in the received status information, whether the second printer-display setting in the target printer has been set to the display-on setting or the display-off setting. When determining that the second printer-display setting in the target printer has been set to the display-on setting, the controller 41 further determines whether the first printer-display setting in the target printer has been set to the ISO-basis setting or the consumption-basis setting.

When determining that the first printer-display setting in the target printer has been set to the ISO-basis setting (S52: ISO basis), the controller 41 executes the process in S44. When determining that the first printer-display setting in the target printer has been set to the consumption-basis setting (S52: consumption basis), the controller 41 executes the process in S45. When determining that the second printer-display setting in the target printer has been set to the display-off setting (S52: display-off), in S53 the controller 41 determines to include neither the seventeenth object 117 nor the eighteenth objects 118 (FIG. 3B and FIG. 7A) in the first display screen, and updates the first display screen. In this case, in the updated first display screen displayed on the display 46, neither the seventeenth object 117 nor the eighteenth objects 118 are included.

After the controller 41 executes the process in S44, S45, or S53, in S46 the controller 41 displays the updated first display screen on the display 46 and ends the display update process.

When the PC-display setting in the PC 12 has not been set, the controller 41 displays the number of printable sheets corresponding to the first printer-display setting which is selected on the target printer by the user, or does not display the number of printable sheets on the basis of the second printer-display setting which is selected on the target printer by the user. This configuration can prevent the user from being forced to perform the display setting on the number of printable sheets on both the target printer and the PC 12, thereby saving the user from doing troublesome labors for the setting operation.

When the PC-display setting in the PC 12 has been set, i.e., when the user has performed the PC-display setting on the PC 12, the controller 41 displays the number of printable sheets according to the PC-display setting of the PC 12 selected by the user. Accordingly, this configuration can more properly meet users' needs, compared with the configuration in which the user cannot select information (the number of printable sheets) to be displayed.

Third Embodiment

In the second embodiment, only when the user has not performed the PC-display setting in the PC 12, the controller 41 displays the number of printable sheets according to the first printer-display setting of the target printer. In the third embodiment, the controller 41 displays the number of printable sheets according to the first printer-display setting of the target printer. The third embodiment is identical to the second embodiment except the configurations and processes described below.

In the third embodiment, the status information transmitted from the printer 11A to the PC 12 includes, for example, the display setting information, the first remaining amount ratio, the second remaining amount ratio, the number of printable sheets (ISO basis), the number of printable sheets (consumption basis), and other information, similarly to the second embodiment. The number of printable sheets (ISO basis) is an example of the claimed "first information", the number of printable sheets (consumption basis) is an example of the claimed "second information", and the display setting information is an example of the claimed "selection information".

In the display update process in FIG. 10, after the controller 41 in the third embodiment executes the process in S42 (S42: Yes), the controller 41 skips the process in S51 and proceeds to the process in S52. Subsequently, the controller 41 executes the process in S44, S45, or S53, and then the process in S46. In this manner, in the third embodiment, the controller 41 of the PC 12 sets the PC-display setting according to the printer-display setting (i.e., the first printer-display setting or the second printer-display setting) of the printer 11A.

In the third embodiment, the controller 41 of the PC 12 sets the PC-display setting according to the printer-display setting of the printer 11A. This configuration can suppress the user from being forced to perform the display settings on the number of printable sheets on both the target printer and the PC 12, thereby saving the user from performing troublesome input operations.

Fourth Embodiment

In the first embodiment, the printer 11A transmits, to the PC 12, the status information including both the number of printable sheets (ISO basis) and the number of printable sheets (consumption basis). In the fourth embodiment, the status information includes the number of printable sheets, which is being displayed on the display 25, of the number of printable sheets (ISO basis) and the number of printable sheets (consumption basis). The fourth embodiment is identical to the first embodiment except the configurations and processes described below.

In addition to, for example, the remaining sheet amounts, the first remaining amount ratio, and the second remaining amount ratio, the status information transmitted from the printer 11A to the PC 12 includes the number of printable sheets, which is being displayed on the display 25, of the number of printable sheets (ISO basis) or the number of printable sheets (consumption basis). The number of printable sheets (ISO basis) is an example of the claimed "first information", whereas the number of printable sheets (consumption basis) is an example of the claimed "second information".

Figure 6B:
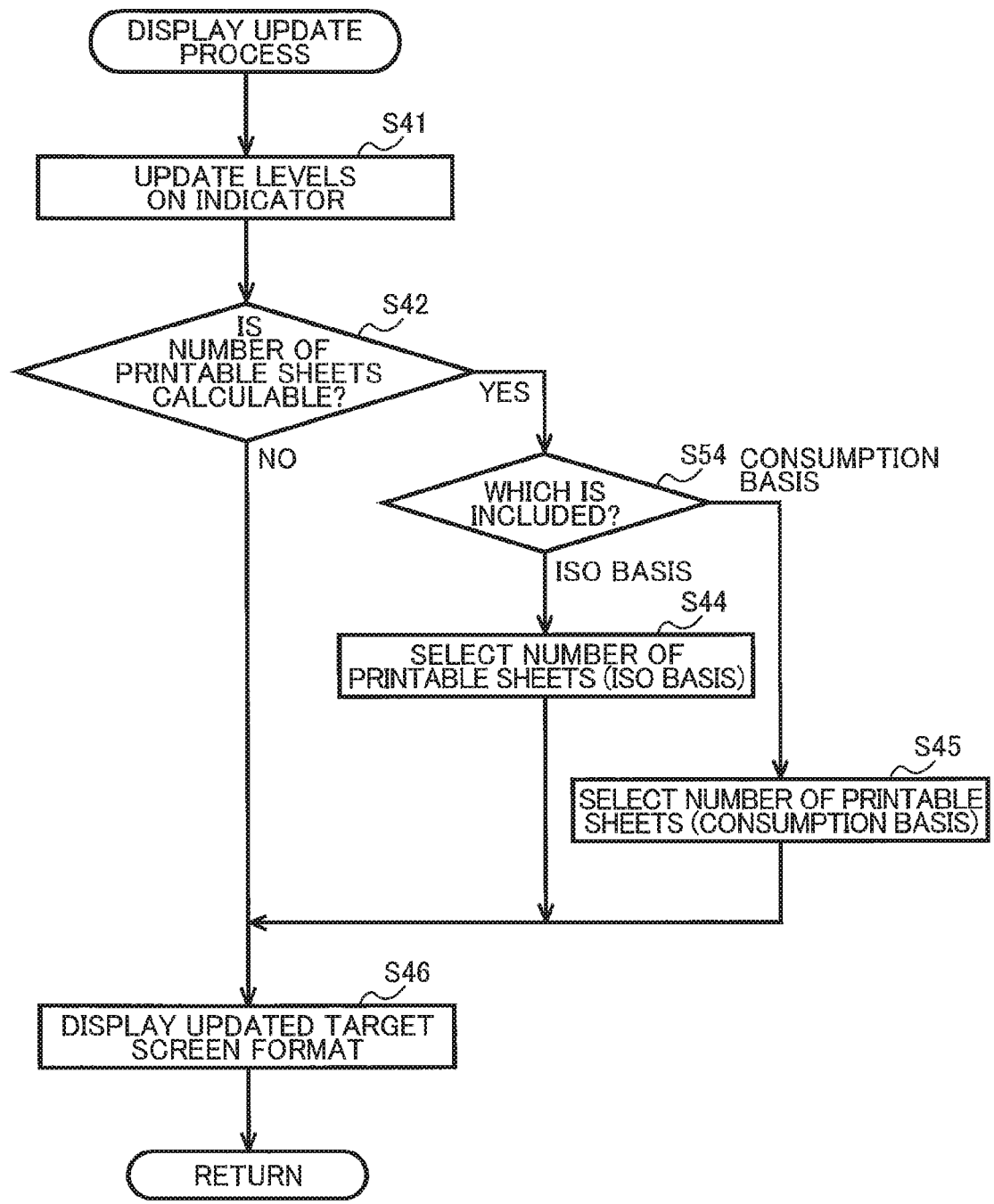
FIG. 6B is a flowchart illustrating steps in a display update process executed by a controller of a PC in a system according to a fourth embodiment.

The controller 41 executes a display update process illustrated in FIG. 6B, instead of the display update process illustrated in FIG. 6A. The target screen format is assumed to be the first display screen. In the display update process in FIG. 6B, the steps identical to those in FIG. 6A are designated with the same reference numerals to avoid duplicating descriptions.

In the fourth embodiment, when in S42 the controller 41 determines that the target printer is capable of calculating the number of printable sheets (S42: Yes), in S54 the controller 41 determines which one of the number of printable sheets (ISO basis) and the number of printable sheets (consumption basis) is included in the received status information.

When the controller 41 determines that the status information includes the number of printable sheets (ISO basis) (S54: ISO basis), in S44 the controller 41 determines to include the seventeenth object 117 "approximate number of printable sheets (ISO basis)" in the first display screen (FIG. 7A) and updates the eighteenth objects 118 with the number of printable sheets (ISO basis) included in the received status information. The first display screen illustrated in FIG. 7A is an example of the claimed "first screen". The text "approximate number of printable sheets (ISO basis)" on the seventeenth object 117 is an example of the claimed "third information".

When the controller 41 determines that the status information includes the number of printable sheets (consumption basis) (S54: consumption basis), in S45 the controller 41 determines to include the seventeenth object 117 "approximate number of printable sheets (consumption basis)" in the first display screen (FIG. 3B) and updates the eighteenth objects 118 with the number of printable sheets (consumption basis) included in the received status information. The first display screen illustrated in FIG. 3B is an example of the claimed "second screen". The text "approximate number of printable sheets (consumption basis)" on the seventeenth object 117 is an example of the claimed "fourth information".

In the fourth embodiment, the controller 41 displays the seventeenth object 117 "approximate number of printable sheets (ISO basis)" or the seventeenth object 117 "approximate number of printable sheets (consumption basis)" on the display 46. This configuration can make the user easily recognize whether the displayed number of printable sheets is "ISO basis" or "consumption basis".

<Modification>

In the first embodiment, when in S13 (FIG. 4) the controller 41 is unable to communicate with the target printer (S13: No), the controller 41 selects an error screen as the target screen format from amount the plurality of types of error screens without determining whether the target printer includes the tanks 62. However, the controller 41 may select an error screen after determining whether the target printer includes the tanks 62.

In the modification, after the controller 41 executes the process in S27 illustrated in FIG. 5B (S27: COLOR), the controller 41 determines, on the basis of the acquired function information, whether the target printer is the printer 11A including the tanks 62 or the printer 11B not including the tanks 62.

When the controller 41 determines that the target printer is the printer 11A, the controller 41 selects, as the target screen format, a fourth error screen (not illustrated) from among the plurality of types of error screens stored in the memory 43. On the other hand, when the controller 41 determines that the target printer is the printer 11B, the controller 41 selects, as the target screen format, the second error screen (FIG. 9B) from among the plurality of types of error screens stored in the memory 43. The second error screen is an example of the claimed "second error screen". The fourth error screen is an example of the claimed "first error screen".

For example, the fourth error screen is a screen obtained by adding, to the second error screen (FIG. 9B), four rectangles representing the four tanks 62. In the fourth error screen, the added four rectangles are disposed below the rectangular twenty-second objects 122 representing the four cartridges 60.

According to this modification, the controller 41 can display the error screen corresponding to each of the printer 11A including the tanks 62 and the printer 11B not including the tanks 62.

What is claimed is:

1. A non-transitory computer-readable storage medium storing computer-readable instructions for an information processing apparatus including: a processor; a network interface; a display; and a memory, the computer-readable instructions, when executed by the processor, causing the information processing apparatus to perform:
(a) setting target printer information to one from among at least one set of printer information stored in the memory, the at least one set of printer information corresponding to at least one printer in one-to-one basis, each of the at least one set of printer information specifying one of a plurality of types to which the corresponding printer belongs, the plurality of types including a first type printer and a second type printer, the first type printer and the second type printer each being configured to:
print using consumable material; and
transmit status information to the information processing apparatus, wherein the status information transmitted from the first type printer includes first information about the consumable material, wherein the status information transmitted from the second type printer includes second information about the consumable material and does not include the first information;
(b) receiving the status information from a target printer via the network interface, the target printer being one specified by the set target printer information from among the at least one printer; and
(c) displaying, when the received status information includes the first information, a first screen on the display; and
(d) displaying, when the received status information includes the second information and does not include the first information, a second screen on the display,
wherein the first information included in the status information transmitted from the first type printer indicates a first cartridge remaining amount and a tank remaining amount, the first cartridge remaining amount being an amount of consumable material remaining in a cartridge attached to the first type printer, the tank remaining amount being an amount of consumable material remaining in a tank of the first type printer, and
wherein the second information included in the status information transmitted from the second type printer indicates a second cartridge remaining amount, the second cartridge remaining amount being an amount of consumable material remaining in a cartridge attached to the second type printer.

2. The non-transitory computer-readable storage medium according to claim 1, wherein the computer-readable instructions, when executed by the processor, causes the information processing apparatus to further perform:
(e) setting a target screen format to one from among a plurality of types of screen formats stored in the memory, the plurality of types of screen formats including a first screen format for the first screen and a second screen format for the second screen,
   wherein, when the set target printer information indicates that the target printer is the first type printer, the (e) setting sets the target screen format to the first screen format,
   wherein, when the set target printer information indicates that the target printer is the second type printer, the (e) setting sets the target screen format to the second screen format,
   wherein, in response to the (b) receiving being performed in a state where the target screen format is set to the first screen format by the (e) setting, the (c) displaying is performed and displays the first screen in which the received status information is reflected, and
   wherein, in response to the (b) receiving being performed in a state where the target screen format is set to the second screen format by the (e) setting, the (d) displaying is performed and displays the second screen in which the received status information is reflected.

3. The non-transitory computer-readable storage medium according to claim 2, wherein the information processing apparatus further includes a user interface,
   wherein the first screen format is a first type screen format and the second screen format is a second type screen format,
   wherein, in response to a selection of another printer from among the at least one printer being received via the user interface after the (a) setting is performed, the (a) setting is again performed and newly sets the target printer information to another printer information specifying the another printer,
   wherein, in response to the target printer information being newly set to the another printer information by the (a) setting within a period of time from a time when the (b) receiving is performed to a time when the (b) receiving is again performed, the (e) setting is performed and newly sets:
      the target screen format to the first type screen format when the newly set target information indicates that the another printer is the first type printer; and
      the target screen format to the second type screen format when the newly set target information indicates that the another printer is the second type printer,
   wherein, in response to the (b) receiving being performed after the newly set target screen format is set by the (e) setting,
      when the newly set target screen format is the first screen format, the (c) displaying is performed and displays the first screen in which the received status information is reflected, and
      when the newly set target screen format is the second screen format, the (d) displaying is performed and displays the second screen in which the received status information is reflected.

4. The non-transitory computer-readable storage medium according to claim 2, wherein the computer-readable instructions, when executed by the processor, causes the information processing apparatus to further perform:
   (f) determining, in response to performing the (a) setting, whether a communication with the target printer is able to be established;
   (g) setting, in response to determining that the communication with the target printer is not able to be established, a target error screen to one from among a plurality of types of error screens stored in the memory, the plurality of types of error screens including a first error screen for the first type printer and a second error screen for the second type printer,
      wherein, when the set target printer information indicates that the target printer is the first type printer, the (g) setting sets the target error screen to the first error screen,
      wherein, when the set target printer information indicates that the target printer is the second type printer, the (g) setting sets the target error screen to the second error screen; and
   (h) displaying, in response to performing the (g) setting, the target error screen set in the (g) setting on the display,
   wherein, in response to the (b) receiving being performed after the (e) setting is performed in response to the communication with the target printer being recovered after the (h) displaying is performed,
      when the target screen format is the first screen format, the (c) displaying is performed and displays the first screen in which the received status information is reflected, and
      when the target screen format is the second screen format, the (d) displaying is performed and displays the second screen in which the received status information is reflected.

5. The non-transitory computer-readable storage medium according to claim 2, wherein the consumable material is colorant,
   wherein the computer-readable instructions, when executed by the processor, causes the information processing apparatus to further perform:
   (f) determining, in response to performing the (a) setting, whether a communication with the target printer is able to be established;
   (g) determining, in response to determining that the communication with the target printer is not able to be established, whether the target printer is configured to perform a printing process using a single colorant or a plurality of colorants;
   (h) setting, in response to performing the (g) determining, a target error screen to one from among a plurality of types of error screens stored in the memory,
      wherein, when the (g) determining determines that the target printer is configured to perform a print process using a plurality of colorants, the (h) setting sets the target error screen to one error screen of the plurality of types of error screens,
      wherein, when the (g) determining determines that the target printer is configured to perform a print process using a single colorant, the (h) setting sets the target error screen to another error screen of the plurality of types of error screens, the another error screen being different from the one error screen; and
   (i) displaying, in response to performing the (h) setting, the target error screen set in the (h) setting on the display, and
   wherein, in response to the (b) receiving being performed after the (e) setting is performed in response to the communication with the target printer being recovered after the (i) displaying is performed,
      when the target screen format is the first screen format, the (c) displaying is performed and displays the first screen in which the received status information is reflected, and when the target screen format is the second screen format, the (d) displaying is performed and displays the second screen in which the received status information is reflected.

6. The non-transitory computer-readable storage medium according to claim 1, wherein the consumable material is colorant,
wherein the first screen displayed by the (c) displaying includes the first cartridge remaining amount and the tank remaining amount which are indicated by the first information included in the received status information, and
wherein the second screen displayed by the (d) displaying includes the second cartridge remaining amount which is indicated by the second information included in the received status information.

7. The non-transitory computer-readable storage medium according to claim 1, wherein the consumable material is colorant,
wherein the first information included in the status information transmitted from the first type printer further indicates first number of printable sheets, the first number of printable sheets being number of printable sheets calculated using a first calculation method on the basis of an amount of colorant remaining in the first type printer,
wherein the second information included in the status information transmitted from the second type printer further indicates second number of printable sheets, the second number of printable sheets being number of printable sheets calculated using a second calculation method on the basis of an amount of colorant remaining in the second type printer,
wherein the first screen displayed by the (c) displaying includes the first number of printable sheets indicated by the first information included in the received status information, and
wherein the second screen displayed by the (d) displaying includes the second number of printable sheets indicated by the second information included in the received status information.

8. The non-transitory computer-readable storage medium according to claim 1, wherein the consumable material is colorant,
wherein the (c) displaying displays the first screen including:
a first object representing the first cartridge remaining amount; and
a second object representing the tank remaining amount,
wherein, on the first screen displayed on the display, the first object and the second object are arranged in a first direction,
wherein the (d) displaying displays the second screen including a third object representing the second cartridge remaining amount.

9. The non-transitory computer-readable storage medium according to claim 8, wherein the first screen displayed by the (c) displaying further includes:
a fourth object representing a status of the first type printer;
a fifth object representing information about troubleshooting; and
a sixth object representing information about cartridges attachable to the first type printer,
wherein the first object and the second object, the fourth object, the fifth object, and the sixth object are arranged in the first direction on the first screen,
wherein the second screen displayed by the (d) displaying further includes:
a seventh object representing a status of the second type printer;
an eighth object representing information about troubleshooting; and
a ninth object representing information about cartridges attachable to the second type printer, and
wherein the third object, the seventh object, the eighth object, and the ninth object are arranged in the first direction on the second screen.

10. The non-transitory computer-readable storage medium according to claim 8, wherein, when the received status information includes the first information and third information about consumable supplies in addition to the first information, the first screen displayed by the (c) displaying further includes a twelfth object representing the third information, and
wherein the twelfth object, the first object, and the second object are arranged in the first direction on the first screen.

11. The non-transitory computer-readable storage medium according to claim 10, wherein the consumable supplies are printing sheets, and
wherein the third information indicates an amount of the printing sheets remaining in the first type printer.

12. The non-transitory computer-readable storage medium according to claim 1, wherein the information processing apparatus further includes a user interface,
wherein the computer-readable instructions, when executed by the processor, causes the information processing apparatus to further perform:
(e) determining, in response to performing the (a) setting, whether a communication with the target printer is able to be established;
(f) determining, in response to determining that the communication with the target printer is not able to be established, whether the target printer supports a prescribed communication recovery tool for recovering the communication with the target printer;
(g) displaying on the display, in response to determining that the target printer supports the prescribed communication recovery tool, a first error screen from among a plurality of types of error screens stored in the memory, the first error screen including a first object selectable via the user interface;
(h) displaying, in response to determining that the target printer does not support the prescribed communication recovery tool, a second error screen from among the plurality of types of error screens, the second error screen including a second object selectable via the user interface;
(i) executing, in response to receiving a selection of the first object included in the first error screen displayed on the display, a recovery process of recovering the communication with the target printer; and
(j) displaying, in response to receiving a selection of the second object included in the second error screen displayed on the display, specific information on the display, the specific information indicating a procedure necessary for recovering the communication with the target printer.

13. The non-transitory computer-readable storage medium according to claim 1, wherein the first screen displayed by the (c) displaying includes a first object, the first object displaying thereon a level incremented or decremented by one (1) in a range of zero (0) to a prescribed maximum number equal to or greater than one (1) to thereby represent the first cartridge remaining amount in a plurality of stages,
- wherein the computer-readable instructions, when executed by the processor, causes the information processing apparatus to further perform, when the received status information includes the first information:
  - (e) determining, as the level to be displayed on the first object, a number corresponding to the first cartridge remaining amount indicated by the first information included in the received status information; and
  - (f) setting, in response to performing the (e) determining, the level to be displayed on the first object,
    - wherein, when the determined number is not zero (0), the (f) setting sets the level to the determined number,
    - wherein, when the determined number is zero (0) and the received status information includes sensor information indicating that the cartridge becomes empty, the (f) setting sets the level to the determined number,
    - wherein, when the determined number is zero (0) and the received status information does not include the sensor information, the (f) setting sets the level to one (1), and
- wherein the (c) displaying displays the first screen including the first object displaying the level set in the (f) setting.

* * * * *